(12) United States Patent
Ishikura et al.

(10) Patent No.: US 11,416,674 B2
(45) Date of Patent: Aug. 16, 2022

(54) INFORMATION PROCESSING APPARATUS, METHOD OF PROCESSING INFORMATION AND STORAGE MEDIUM

(71) Applicants: Koji Ishikura, Kanagawa (JP);
Yoshiharu Tojo, Kanagawa (JP);
Toshifumi Yamaai, Kanagawa (JP);
Ryoh Aruga, Kanagawa (JP)

(72) Inventors: Koji Ishikura, Kanagawa (JP);
Yoshiharu Tojo, Kanagawa (JP);
Toshifumi Yamaai, Kanagawa (JP);
Ryoh Aruga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/514,206

(22) Filed: Jul. 17, 2019

(65) Prior Publication Data
US 2020/0026752 A1    Jan. 23, 2020

(30) Foreign Application Priority Data

Jul. 20, 2018 (JP) .............................. JP2018-137254
Jun. 21, 2019 (JP) .............................. JP2019-115409

(51) Int. Cl.
*G06F 40/174*    (2020.01)
*G06F 3/0482*    (2013.01)
(Continued)

(52) U.S. Cl.
CPC .......... *G06F 40/174* (2020.01); *G06F 3/0482* (2013.01); *G06V 10/40* (2022.01); *G06V 30/10* (2022.01)

(58) Field of Classification Search
None
See application file for complete search history.

(56) References Cited

U.S. PATENT DOCUMENTS 8,520,889 B2    8/2013  Navon et al.
8,564,846 B2   10/2013  Yamaai
(Continued)

FOREIGN PATENT DOCUMENTS

JP    2004-062351     2/2004
JP    2012-190434    10/2012
(Continued)

OTHER PUBLICATIONS

Chen, Nawei, and Dorothea Blostein. "A survey of document image classification: problem statement, classifier architecture and performance evaluation." International Journal of Document Analysis and Recognition (IJDAR) 10, No. 1 (2007): 1-16. (Year: 2007).*
(Continued)

*Primary Examiner* — Frank D Mills
(74) *Attorney, Agent, or Firm* — IPUSA, PLLC

(57) ABSTRACT

An information processing apparatus includes circuitry configured to acquire first form definition information defining a positional relationship between one or more items and a respective value of the one or more items stored in a memory, recognize and extract a specific item set with a specific character string and a specific value of the specific item from data of a form image based on the first form definition information as a recognition result, and display, on a display, the recognition result and an input reception section used for receiving an input of second form definition information.

10 Claims, 26 Drawing Sheets

(51) Int. Cl.
*G06V 10/40* (2022.01)
*G06V 30/10* (2022.01)

(56) References Cited

U.S. PATENT DOCUMENTS

| | | | |
|---|---|---|---|
| 10,740,372 B2 | 8/2020 | Matsumoto | |
| 2002/0025072 A1 | 2/2002 | Yamaai | |
| 2003/0174904 A1 | 9/2003 | Yamaai | |
| 2007/0021771 A1 | 9/2007 | Yamaai | |
| 2008/0069473 A1 | 3/2008 | Tojo | |
| 2009/0110279 A1* | 4/2009 | Jain | G06K 9/2054 382/176 |
| 2009/0265605 A1* | 10/2009 | Kaneshiro | G06Q 10/10 715/221 |
| 2011/0222776 A1 | 9/2011 | Jiang et al. | |
| 2013/0251211 A1* | 9/2013 | Palm | G06K 9/00456 382/112 |
| 2014/0089302 A1* | 3/2014 | Lapir | G06F 16/24575 707/723 |
| 2014/0177951 A1* | 6/2014 | Biffar | G06K 9/6254 382/161 |
| 2014/0195416 A1* | 7/2014 | Linscott | G06Q 20/102 705/39 |
| 2014/0207631 A1* | 7/2014 | Fisher | G06V 30/412 382/229 |
| 2015/0039707 A1* | 2/2015 | Gregg | G06F 16/93 709/206 |
| 2015/0058374 A1 | 2/2015 | Golubev et al. | |
| 2015/0187022 A1 | 7/2015 | Takahashi et al. | |
| 2016/0171627 A1* | 6/2016 | Lyubarskiy | G06Q 40/12 705/30 |
| 2016/0216851 A1* | 7/2016 | Kanivets | G06K 9/18 |
| 2016/0321499 A1* | 11/2016 | Meier | G06K 9/6256 |
| 2017/0147653 A1* | 5/2017 | McCormick | G06Q 10/10 |
| 2017/0351913 A1* | 12/2017 | Chen | G06K 9/00442 |
| 2018/0032483 A1* | 2/2018 | Omiya | G06F 3/0482 |
| 2018/0144314 A1* | 5/2018 | Miller | G06Q 20/14 |
| 2018/0167440 A1* | 6/2018 | Rybkin | H04N 21/00 |
| 2018/0227251 A1 | 8/2018 | Takishima et al. | |
| 2018/0232573 A1* | 8/2018 | Yamazaki | G06K 9/2063 |

FOREIGN PATENT DOCUMENTS

| | | |
|---|---|---|
| JP | 2016-051339 | 4/2016 |
| JP | 2018-128843 | 8/2018 |

OTHER PUBLICATIONS

Extended European Search Report for 19187374.4 dated Nov. 21, 2019.
European Office Action for 19187374.4 dated Jun. 23, 2021.
Japanese Office Action for 2019-115409 dated Mar. 1, 2022.

* cited by examiner

FIG. 3

| DEFINITION ID | DEFINITION TYPE | FORM TYPE | IDENTIFICATION CHARACTER STRING |
|---|---|---|---|
| H01 | GENERAL-USE DEFINITION INFORMATION | INVOICE | INVOICE, INVOICE FORM |
| H02 | GENERAL-USE DEFINITION INFORMATION | ESTIMATE | ESTIMATE, ESTIMATION, ESTIMATING |
| H03 | GENERAL-USE DEFINITION INFORMATION | PURCHASE ORDER | ORDER, PURCHASE ORDER, ORDER FORM |
| S01 | SPECIFIC DEFINITION INFORMATION | COMPANY U | UNIMAT XXX |
| S02 | SPECIFIC DEFINITION INFORMATION | VOUCHER FOR COMPANY S | SXXX |
| A01 | INDIVIDUAL-USER DEFINITION INFORMATION | INVOICE FOR COMPANY R | COMPANY R + INVOICE |
| A02 | INDIVIDUAL-USER DEFINITION INFORMATION | ... | ... |
| B01 | INDIVIDUAL-USER DEFINITION INFORMATION | ESTIMATE FOR COMPANY T | COMPANY T + ESTIMATE |

FIG. 4

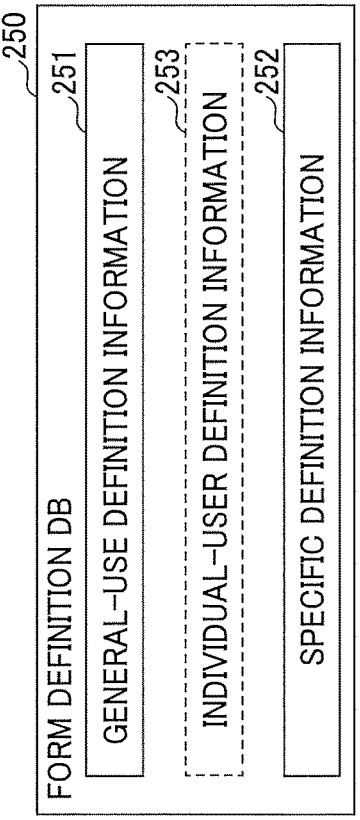

DEFINITION ID = H01 (INVOICE)

| ITEM ID | ITEM NAME | DIREC-TION | DISTANCE (RIGHT) | DISTANCE (LEFT) | | | | | | | | | | | | | | | ... |
|---|---|---|---|---|---|---|---|---|---|---|---|---|---|---|---|---|---|---|---|
| 1 | | | | | | | | | | | | | | | | | | | |
| 2 | TOTAL | RD | | | | | | | | | | | | | | | | | |
| 3 | SUB-TOTAL | R | | | | | | | | | | | | | | | | | |
| 4 | INVOICE NUMBER; INVOICE NO. | R | | | | | | | | | | | | | | | | | |
| 5 | | | | | | | | | | | | | | | | | | | |
| 6 | CODE; GOODS CODE; PRODUCT NUMBER | D | | | | | | | | | | | | | | | | | |
| 7 | NAME; GOODS NAME; PRODUCT NAME | D | | | | | | | | | | | | | | | | | |
| 8 | NUMBER OF PIECES | D | | | | | | | | | | | | | | | | | |
| 9 | AMOUNT | D | | | | | | | | | | | | | | | | | |
| 10 | UNIT PRICE | D | | | | | | | | | | | | | | | | | |
| 11 | PRICE; PRICE (WITHOUT TAX) | D | | | | | | | | | | | | | | | | | |
| 12 | TRANSFER ACCOUNT; BANK NAME; BANK NAME; BANK NAME, BANK NAME: | R | | | | | | | | | | | | | | | | | |
| 13 | BRANCH NAME, BRANCH NAME, BRANCH NAME, BRANCH NAME, BRANCH NAME: | R | | | | | | | | | | | | | | | | | |
| 14 | ACCOUNT; ACCOUNT TYPE | R | | | | | | | | | | | | | | | | | |
| 15 | ACCOUNT NUMBER; ACCOUNT NUMBER | R | | | | | | | | | | | | | | | | | |
| 16 | ACCOUNT NAME | R | | | | | | | | | | | | | | | | | |
| 17 | PAYMENT DUE DATE | R | | | | | | | | | | | | | | | | | |

| DEFINITION ID = S01(VOUCHER FOR COMPANY S) | | | | |
|---|---|---|---|---|
| ITEM ID | ITEM NAME | DIREC-TION | DISTANCE (RIGHT) | DISTANCE (LEFT) |
| 2 | TOTAL | RD | | |
| 3 | SUBTOTAL | R | | |
| 4 | INVOICE NUMBER; INVOICE NO. | R | | |
| 6 | CODE; GOODS CODE; PRODUCT NUMBER | D | | |
| 7 | NAME; GOODS NAME; PRODUCT NAME | D | | |
| 8 | NUMBER OF PIECES | D | | |
| 9 | AMOUNT | D | | |
| 10 | UNIT PRICE | D | | |
| 11 | PRICE; PRICE (WITHOUT TAX) | D | | |
| 17 | PAYMENT DUE DATE | R | | |

FIG. 7

DEFINITION ID = A01 (INVOICE FOR COMPANY R), USER ID = A                    253

| ITEM ID | ITEM NAME | DIREC-TION | DISTANCE (RIGHT) | DISTANCE (LEFT) |
|---|---|---|---|---|
| 2 | TOTAL | RD | | |
| 3 | SUBTOTAL | R | | |
| 11 | PRICE; PRICE (WITHOUT TAX) | D | | |
| 17 | PAYMENT DUE DATE | R | | |
| | ... | | | |

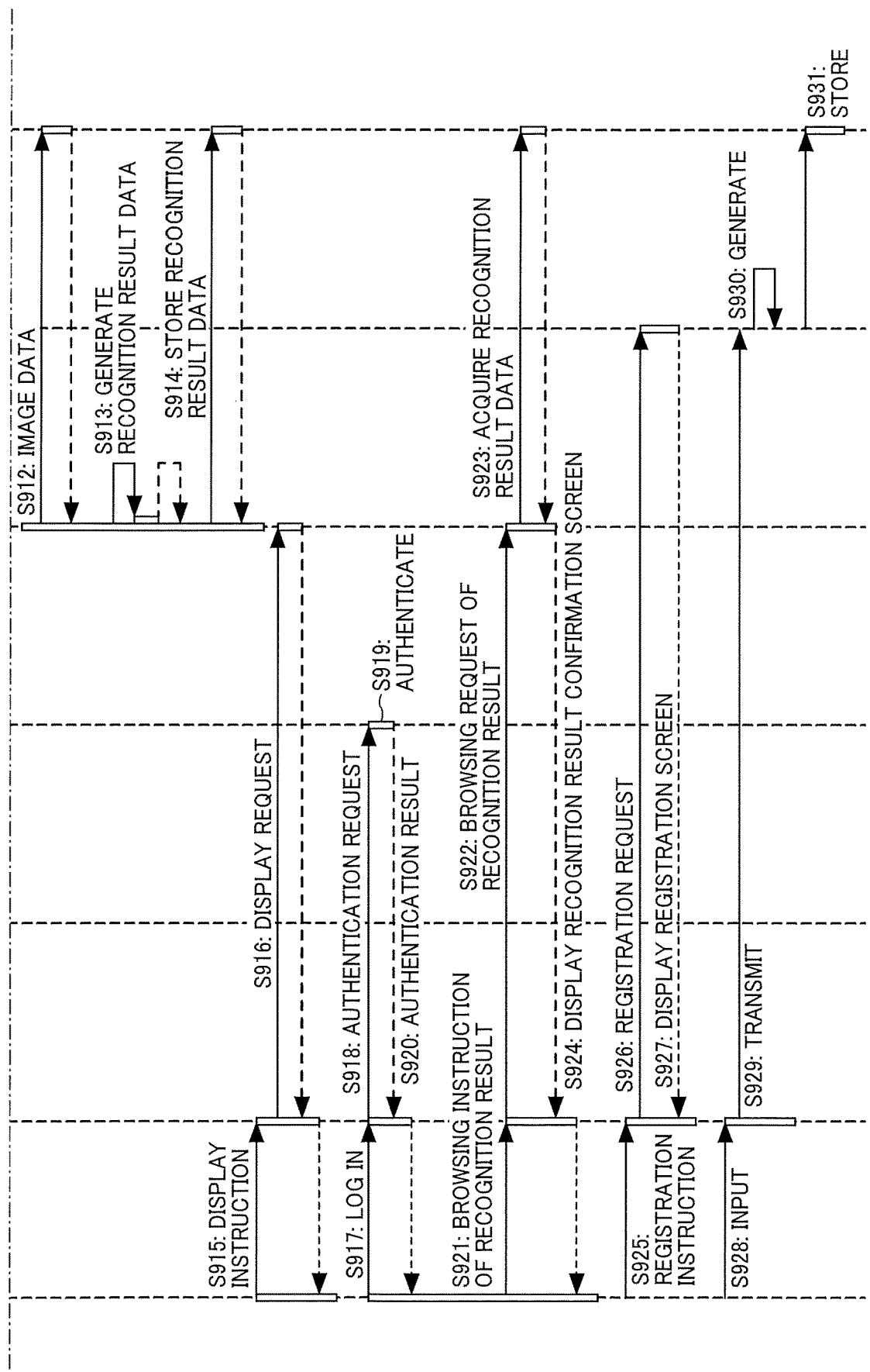

FIG. 10A

| JOB ID | USER ID | FORM IMAGE FILE PATH | RECOGNITION RESULT FILE PATH | STATUS | DEFINITION ID |
|---|---|---|---|---|---|
| J1 | A123 | XXX | YYYY | COMPLETED | H01, A01 |
| J2 | B111 | XXY | ... | ... | S01 |
| ... | ... | ... | ... | ... | ... |

```
<?xml version="1.0" encoding="UTF-8"?>
<Company R>
<Image>Sample corporation invoice.pdf</Image>
<Image_jshfilename>C:/folder/Sample corporation invoice.pdf </Image_jshfilename>
<modifyDate>2018-06-12T09:36:02</modifyDate>
<processDate>2018-06-26T13:26:33</processDate>
<result>true</result>
<primarykey>-1</primarykey>
<2(※Total)>170,000</2>
<4(※InvoiceNumber)>A123BF4</4>
......
</Company R>
```

FIG. 12A

EXTRACTED AS "GENERAL INVOICE"

INVOICE

ISSUED DATE: 2017.5.29
INVOICE DATE: 2017.5.29

TOKYO-TO SHINAGAWA-KU
HIGASHI SHINAGAWA XXX

R CORPORATION INC.
TOKYO-TO MINATO-KU
AKASAKA XXX BUILDING

TEL 03-XXXX-XXXX
TO SAMPLE CORPORATION INC.
FIRST BUSINESS DEPARTMENT,
FIRST UNIT

PROCUREMENT DEPARTMENT
SECTION: HARDWARE
DEPARTMENT
TEL.: 03-xxxx-xxxx

××××××××××
××××××××××

DESIGNATED ACCOUNT:
×××××× ×××××××

| INVOICE NUMBER | MAKER TYPE NUMBER | TRANSFER NUMBER |
|---|---|---|
| A1238E4 | Y-AB-32456 | 100P1E |

NAME
TELEVISION TYPE 72

REMARKS

| NUMBER OF ORDER | UNIT | CURRENCY | UNIT PRICE | TOTAL |
|---|---|---|---|---|
| 1 | SET | YEN | 170,000 | 170,000 |

DELIVERY DATE
2017/05/16

DELIVERY DESTINATION

| INVOICE INFORMATION | |
|---|---|
| BILLER OF INVOICE | R CORPORATION |
| INVOICE AMOUNT | 170,000 |
| INVOICE AMOUNT (WITHOUT TAX) | NONE |
| INVOICE NUMBER | A1238E4 |
| INVOICE DATE | 2017/5/29 |
| CARRYOVER FROM LAST MONTH | XXXXX |
| SALES AMOUNT IN THIS MONTH | XXXXX |
| CLOSING DATE | XXXXX |
| PAYMENT DATE | XXXXX |
| ORDER NUMBER | XXXXX |

[REGISTRATION] [TO DEFINITION REGISTRATION SCREEN]

FIG. 12B

EXTRACTED AS "GENERAL INVOICE" — 125

INVOICE — 121

ISSUED DATE: 2017.5.29
INVOICE DATE: 2017.5.29

TOKYO-TO SHINAGAWA-KU
HIGASHI SHINAGAWA XXX

R CORPORATION INC.
TOKYO-TO MINATO-KU
AKASAKA XXX BUILDING

TEL 03-XXXX-XXXX
TO SAMPLE CORPORATION INC.
FIRST BUSINESS DEPARTMENT,
FIRST UNIT

PROCUREMENT DEPARTMENT
SECTION: HARDWARE
DEPARTMENT
TEL : 03-xxxx-xxxx

××××××××××  ××××××××
××××××××××  ××××××××

DESIGNATED ACCOUNT:
×××××× ×××××××

| INVOICE NUMBER | MAKER TYPE NUMBER | TRANSFER NUMBER |
|---|---|---|
| A1238E4 | Y-AB-32456 | 100P1E |

NAME
TELEVISION TYPE 72

REMARKS

| NUMBER OF ORDER | UNIT | CURRENCY | UNIT PRICE | TOTAL |
|---|---|---|---|---|
| 1 | SET | YEN | 170,000 | 170,000 |

DELIVERY DATE
2017/05/16

DELIVERY DESTINATION

[REGISTRATION] — 123  [TO DEFINITION REGISTRATION SCREEN] — 124

INVOICE INFORMATION — 122

| | |
|---|---|
| BILLER OF INVOICE | R CORPORATION |
| INVOICE AMOUNT | 170,000 |
| INVOICE AMOUNT (WITHOUT TAX) | NONE |
| INVOICE NUMBER | A1238E4 |
| INVOICE DATE | 2017/5/29 |
| CARRYOVER FROM LAST MONTH | XXXXX |
| SALES AMOUNT IN THIS MONTH | XXXXX |
| CLOSING DATE | XXXXX |
| PAYMENT DATE | XXXXX |
| ORDER NUMBER | XXXXX |
| SUBJECT CODE | 0001 (CASH) |
| DEPARTMENT CODE | 0002 (SALES) |

| DEFINITION ID = A01 (INVOICE FOR COMPANY R), USER ID = A | | | | |
|---|---|---|---|---|
| ITEM ID | ITEM NAME | DIREC-TION | DISTANCE (RIGHT) | DISTANCE (LEFT) |
| 2 | TOTAL | RD | | |
| 3 | SUBTOTAL | R | | |
| 11 | PRICE; PRICE (WITHOUT TAX) | D | | |
| 17 | PAYMENT DUE DATE | R | | |

| USER INPUT INFORMATION   DEFINITION ID = A01 (INVOICE FOR COMPANY R), USER ID = A | | |
|---|---|---|
| ITEM ID | ITEM NAME | ITEM VALUE |
| u01 | SUBJECT CODE | 0001 (CASH) |
| u02 | DEPARTMENT CODE | 0002 (SALES) |

EXTRACTED AS "GENERAL INVOICE"

INVOICE

ISSUED DATE: 2017.5.29
INVOICE DATE: 2017.5.29

TOKYO-TO SHINAGAWA-KU
HIGASHI SHINAGAWA XXX

TEL 03-XXXX-XXXX
TO SAMPLE CORPORATION INC.
FIRST BUSINESS DEPARTMENT,
FIRST UNIT

R CORPORATION INC.
TOKYO-TO MINATO-KU
AKASAKA XXX BUILDING

PROCUREMENT DEPARTMENT
SECTION:HARDWARE
DEPARTMENT
TEL: 03-XXXX-XXXX

DESIGNATED ACCOUNT:
xxxxxx xxxxxxx

| INVOICE NUMBER | MAKER TYPE NUMBER | TRANSFER NUMBER | | |
|---|---|---|---|---|
| A1238E4 | Y-AB-32456 | 100P1E | | |
| NAME | | | | |
| TELEVISION TYPE 72 | | | | |
| REMARKS | | | | |
| NUMBER OF ORDER | UNIT | CURRENCY | UNIT PRICE | TOTAL |
| 1 | SET | YEN | 170,000 | 170,000 |
| DELIVERY DATE | | | | |
| 2017/05/16 | | | | |
| DELIVERY DESTINATION | | | | |

[ REGISTRATION ]   [ TO DEFINITION REGISTRATION SCREEN ]

---

CORRECTION ITEM

IF CURRENT PORTION (RED) IS NOT
SUITABLE FOR INVOICE SOURCE
EXTRACTION PORTION, SELECT
SUITABLE PORTION FROM NEXT
CANDIDATE (BLUE). IF EXTRACTION
PORTION IS CORRECT BUT
EXTRACTION CONTENT IS WRONG,
CORRECT DIRECTLY BY INPUTTING
CORRECTION.

INVOICE SOURCE: [ R CORPORATION ]

IF NO CORRECT NEXT CANDIDATE [ ADD CANDIDATE ]

[ CORRECTION COMPLETED ]

[ CANCEL ]

FIG. 15

```
Browser
http://xxx-solutions.com/ide_web_service/                              — 143
```

| | | 142 | | 141 | 150 |

Right panel (150) — Invoice document:

SAVE    CANCEL

INVOICE

ISSUE DATE 2016/1/27
INVOICE NO. IV-123456
CLIENT ID  9876543

XX SOLUTIONS CORPORATION
TOKYO-TO SHINAGAWA-KU
HIGASHI SHINAGAWA XXX
TEL: (REPRESENTATIVE):03-XXXX-XXXX

INVOICE DESTINATION
XX SOLUTIONS CORPORATION
CONTENTS SOLUTION DEPARTMENT
TO MR. TOKYO TARO
HOKKAIDO SAPPORO-SHI
CHUOU-KU KIT ANI-JOU
011-XXXX-0000

SHIPPING DESTINATION
XX SOLUTIONS CORPORATION
CONTENTS SOLUTION DEPARTMENT
TO MRS. YOKOHAMA HANAKO
HOKKAIDO SAPPORO-SHI
CHUOU-KU KIT ANI-JOU
ORDER NUMBER
011-XXXX-8888

| ORDER NUMBER | SHIPPED DATE |
| --- | --- |
| PO123456 | 2015/12/30 |

| GOODS CODE | NAME OF GOODS | NUMBERS | UNIT PRICE | TAX | TOTAL |
| --- | --- | --- | --- | --- | --- |
| 23423423 | XXXX IMAGE SCANNER FI-7180 | 4 | ¥180,000 | × | ¥720,000 |
| 45645645 | META DATA EXTRACTOR LIBRARY FULL PACKAGE | 1 | ¥2,000,000 | × | ¥2,000,000 |

REMARKS
1. PLEASE TRANSMIT PAYMENT WITHIN 30 DAYS
2. DESCRIBE INVOICE NUMBER WHEN TO TRANSMIT PAYMENT

SUB-TOTAL            ¥2,720,000
TAXED AMOUNT         ¥2,720,000
TAX RATE             8.000%
CONSUMPTION TAX      ¥217,600
DISCOUNT             (¥37,600)
TOTAL                ¥2,900,000

DOCUMENT SELECTION    RE-EXTRACTION    LEARNING

Left panel (142):

| BILLER OF INVOICE | XX SOLUTIONS |
| --- | --- |
| INVOICE AMOUNT (WITH TAX) | 2900000 |
| INVOICE AMOUNT (WITHOUT TAX) | 2720000 |
| INVOICE NUMBER | IV-123456 |
| INVOICE DATE | 2016/01/27 |
| CARRYOVER FROM LAST MONTH | |
| *SALES AMOUNT IN THIS MONTH | ⊗ |

— 152
SETTINGS
• KEY WORD
• DIRECTION
• NORMAL EXPRESSION
• MARGIN
• DATA TYPE
• etc.

151

● user1   ✎ ⊗    — 154
  DETAIL ▶   ⊕
153
```

INFORMATION PROCESSING APPARATUS, METHOD OF PROCESSING INFORMATION AND STORAGE MEDIUM

CROSS-REFERENCE TO RELATED APPLICATION

This application claims priority pursuant to 35 U.S.C. § 119(a) to Japanese Patent Application Nos. 2018-137254, filed on Jul. 20, 2018 and 2019-115409, filed on Jun. 21, 2019 in the Japan Patent Office, the disclosure of which are incorporated by reference herein in its entirety.

BACKGROUND

Technical Field

This disclosure relates to an information processing apparatus, a method of processing information and a storage medium.

Background Art

When document forms are to be recognized using conventional methods, the "form definition" registering description positions and attributes of reading target character strings described on form images are used to read the reading target character strings and recognize the attributes of the reading target character strings.

The form recognition processing of forms having various types of layouts and forms having unknown layouts can be performed using conventional methods. For example, item names of the reading target items can be defined in advance, with which the item names of items can be identified from the character strings recognized in the form image, and then values of the items can be extracted from the character strings set in the vicinity of the identified item names.

When the above-described form definition information indicating the definition information of forms are to be newly generated, expert knowledge on the recognition processing of forms is required. Therefore, when conventional methods are to be implemented, expert engineers interview general users of forms to obtain form layout information to be used for generating the form definition because changing the form definition information and creating new form definition information are too difficult for general users.

SUMMARY

As one aspect of the present invention, an information processing apparatus is devised. The information processing apparatus includes circuitry configured to acquire first form definition information defining a positional relationship between one or more items and a respective value of the one or more items stored in a memory; recognize and extract a specific item set with a specific character string and a specific value of the specific item from data of a form image based on the first form definition information as a recognition result; and display, on a display, the recognition result and an input reception section used for receiving an input of second form definition information.

As another aspect of the present invention, a method of processing information is devised. The method includes acquiring first form definition information defining a positional relationship between one or more items and a respective value of the one or more items stored in a memory; recognizing a specific item set with a specific character string and a specific value of the specific item from data of a form image based on the first form definition information; extracting the specific item set with the specific character string and the specific value of the specific item as a recognition result; and displaying, on a display, the recognition result and an input reception section used for receiving an input of second form definition information.

As another aspect of the present invention, a non-transitory computer readable storage medium storing one or more instructions that, when executed performed by one or more processors, cause the one or more processors to perform a method of processing information is devised. The method includes acquiring first form definition information defining a positional relationship between one or more items and a respective value of the one or more items stored in a memory; recognizing a specific item set with a specific character string and a specific value of the specific item from data of a form image based on the first form definition information; extracting the specific item set with the specific character string and the specific value of the specific item as a recognition result; and displaying, on a display, the recognition result and an input reception section used for receiving an input of second form definition information.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 3 is an example of a type determination database (DB) according to the first embodiment;

FIG. 4 is an example of a form definition database (DB) storing a plurality of types of form definition information according to the first embodiment;

FIG. 5 is an example of a general-use definition information according to the first embodiment;

FIG. 6 is an example of specific definition information according to the first embodiment;

FIG. 7 is an example of individual-user definition information according to the first embodiment;

FIGS. 9A and 9B (FIG. 9) are an example sequence diagram illustrating an operation of the form recognition system according to the first embodiment;

FIGS. 10A and 10B are examples of information generated by operating the form recognition system according to the first embodiment;

FIG. 12A is an example of confirmation screen of a recognition result generated by a display screen generation unit according to the first embodiment;

FIG. 12B is another example of confirmation screen of a recognition result generated by a display screen generation unit according to the first embodiment;

FIG. 12C is an example case of associating user input information and individual-user definition information;

FIG. 13 is another example of a confirmation screen of a recognition result generated by a display screen generation unit according to the first embodiment;

FIG. 15 is an example of a registration screen (as second stage screen) of individual-user definition information according to the first embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

First Embodiment

Figure 1:
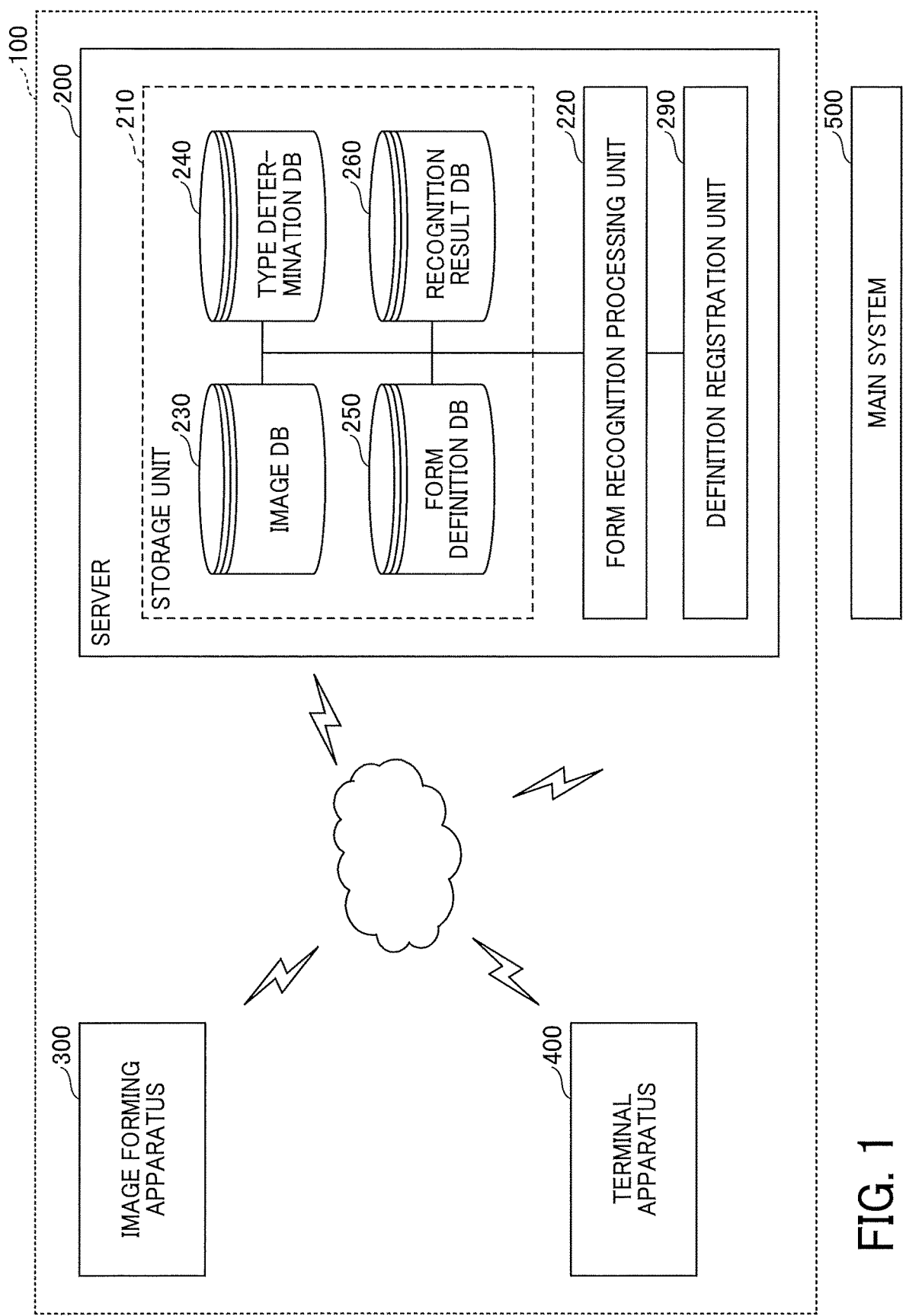
FIG. 1 is an example system configuration of a form recognition system according to a first embodiment.

Hereinafter, a description is given of one or more embodiments of the present invention with reference to the drawings. FIG. 1 is an example of a system configuration of a form recognition system 100 of a first embodiment of the present invention.

As indicated in FIG. 1, the form recognition system 100 includes, for example, a server 200, an image forming apparatus 300, and a terminal apparatus 400. As to the form recognition system 100, the server 200, the image forming apparatus 300, and the terminal apparatus 400 are connected to each other via a network, such as the Internet.

Further, the terminal apparatus 400 is connected to, for example, a main system 500 via the network. The main system 500 can be used as a system that performs specific processing using, for example, recognition results of forms obtained in the form recognition system 100. Specifically, the main system 500 is, for example, an accounting system, an estimation system, or other systems.

In the form recognition system 100, the server 200 extracts one or more items and values of the one or more items from image data of form images read or scanned by using a scanner function of the image forming apparatus 300, and associates the one or more items and the values of the one or more items as text data. Hereinafter, the one or more items and the values of the one or more items may be simply referred to as the item (e.g., item name) and the item value.

In this description, an image of form read or scanned by the scanner function of the image forming apparatus 300 is referred to as a form image, and image data of the form image is referred to as form image data. The form includes various types of form in this description.

In this description, the extraction of the item and the item value from the form image, and converting the item and the item value into text data and associating the item and the item value is referred to as a form recognition or form recognition processing.

As indicated in FIG. 1, the server 200 includes, for example, a storage unit 210, a form recognition processing unit 220, and a definition registration unit 290. The storage unit 210 stores, for example, an image database (DB) 230, a type determination database (DB) 240, a form definition database (DB) 250, and a recognition result database (DB) 260.

The image DB 230 stores the form image data. The type determination DB 240 stores information to be referred to when determining a type of each form. The form definition DB 250 stores the form definition information to be referred to when the form recognition processing is performed by the form recognition processing unit 220. The recognition result DB 260 stores information indicating results of the form recognition processing performed by the form recognition processing unit 220.

The form recognition processing unit 220 acquires the form image data stored in the image DB 230 and refers to the type determination DB 240 to determine the type of form and to specify or identify the form definition information to be referred to. Further, the form recognition processing unit 220 performs the form recognition processing based on the specified or identified form definition information using the form definition DB 250, and stores recognition results of the form recognition processing in the recognition result DB 260. In this description, the form definition information includes, for example, information indicating a description position of an item name included in the form, and information indicating a positional relationship between the item name and the item value.

The definition registration unit 290 displays, on a display of the terminal apparatus 400, an input screen to be used for generating a part of the form definition information among the form definition information to be stored in the form definition DB 250, and then generates the form definition information based on one or more values input via the input screen. Then, the definition registration unit 290 stores and registers the generated form definition information in the form definition DB 250. Then, based on the form definition information stored in the form definition DB 250 in advance, the definition registration unit 290 causes the input screen to display both the recognition result of the form image data and an input field to be used for generating new form definition information.

In this disclosure, the form definition information stored in the form definition DB 250 in advance includes, for example, general-use definition information and specific definition information.

The general-use definition information corresponds to the form definition information used for defining layouts of general forms. The general-use definition information is also referred to as first form definition information in this description.

The specific definition information corresponds to the form definition information used for defining specific forms issued by specific business entities. For example, the specific form corresponds to a slip of courier, used in general.

In this disclosure, the form definition information registered by the definition registration unit 290 is referred to as individual-user definition information, which is also referred to as second form definition information in this description. In other words, the individual-user definition information is a part of the form definition information stored in the form definition DB 250.

The individual-user definition information corresponds to the form definition information used for defining a layout of individual-user unique form, which is used by an individual-user that uses the form recognition system 100.

In this disclosure, by displaying both the recognition result based on the pre-registered general-use definition information and the input field used for inputting the individual-user definition information, the form recognition system 100 can assist or support the user when inputting the individual-user definition information by himself or herself, with which the individual-user definition information can be generated easily.

In the form recognition system 100, the image forming apparatus 300 is, for example, a multifunctional apparatus having a scanner function. The image forming apparatus 300 can be installed with various applications for implementing various functions, such as copying function, facsimile function, and scanner function, and these functions can be implemented by selecting corresponding applications.

The terminal apparatus 400 is used by a user who uses the form recognition system 100. The form recognition result obtained by the server 200 can be displayed on a display of the terminal apparatus 400.

In this disclosure, the user is, for example, an entity, such as company. More specifically, the user includes enterprises, companies, groups or the like that have made contracts to use services provided by the form recognition system 100.

In an example case of FIG. 1, the server 200 includes four databases in the storage unit 210, but not limited thereto. For example, some of the databases can be set in an external apparatus with respect to the server 200, or all of the databases can be set in the external apparatus.

In an example case of FIG. 1, the server 200 (one information processing apparatus) implements the form recognition processing unit 220, but not limited thereto. For example, the form recognition processing unit 220 can be implemented using a plurality of information processing apparatuses.

In an example case of FIG. 1, the number of the image forming apparatuses 300 and the number of the terminal apparatuses 400 included in the form recognition system 100 are respectively one, but the number of the image forming apparatuses 300 and the terminal apparatuses 400 included in the form recognition system 100 can be any number.

Figure 2:
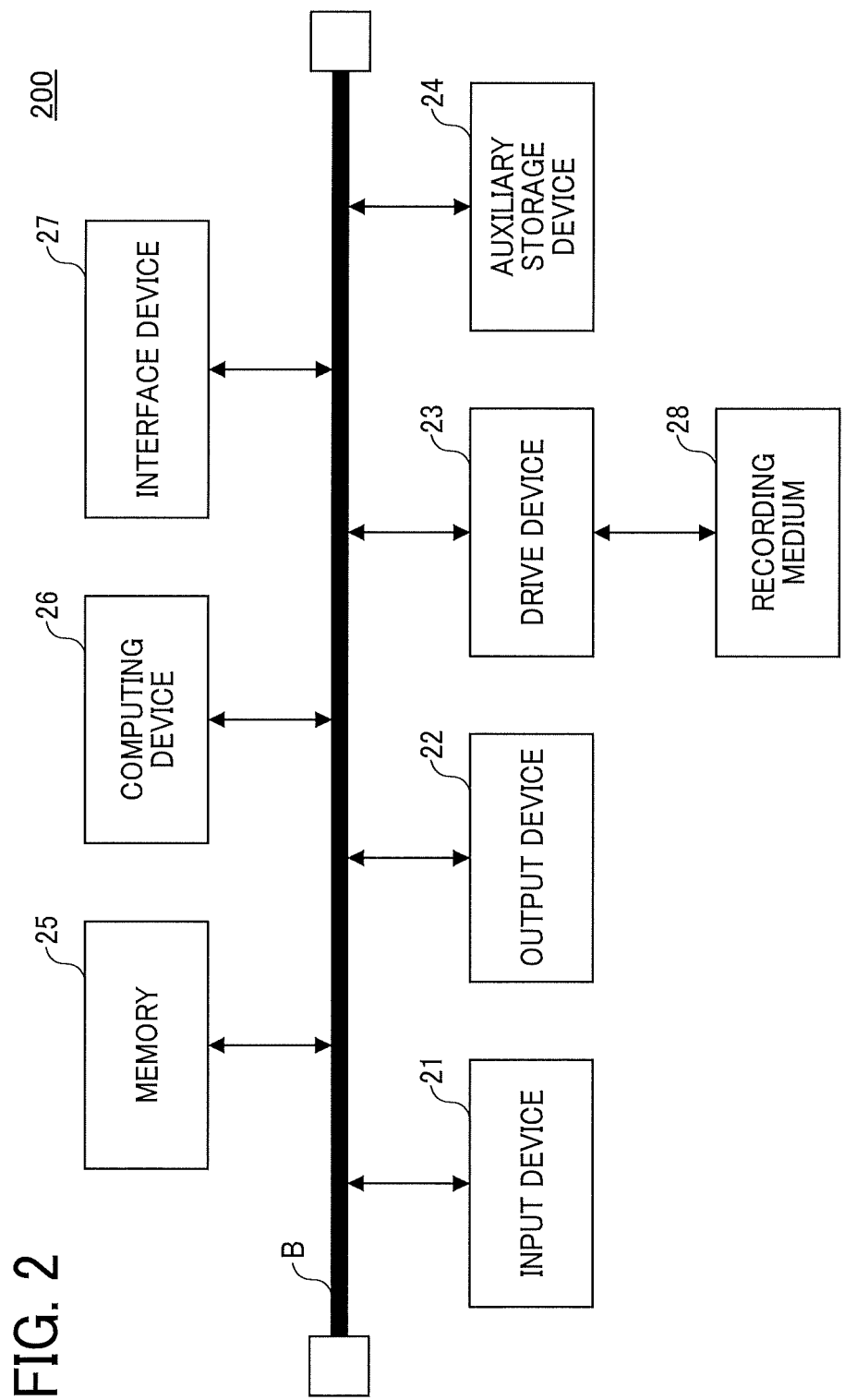
FIG. 2 is an example block diagram of a hardware configuration of a server according to the first embodiment.

Hereinafter, a description is given of a hardware configuration of the server 200 with reference to FIG. 2. FIG. 2 is an example of a hardware block diagram of the server 200 according to the first embodiment.

The server 200, used as an information processing apparatus, includes, for example, an input device 21, an output device 22, a drive device 23, an auxiliary storage device 24, a memory 25, a computing device 26, and an interface device 27, which are connected to each other by a bus B.

The input device 21, used for inputting various kinds of information, employs, for example, a keyboard, a pointing device, or the like. The output device 22, used for outputting various information, employs, for example, a display or the like. The interface device 27 employs, for example, a local area network (LAN) card or the like, to connect to the network.

Information processing program is at least a part of programs used for controlling the server 200. The information processing program can be provided by, for example, by distributing a recording medium 28, downloading from the network, or the like. The recording medium 28 storing the information processing program can use various types of recording media, such as a recording media recording information optically, electrically or magnetically (e.g., CD-ROM, flexible disk, magneto-optical disk), and semiconductor memories electrically storing information (e.g., ROM, flash memory). In this description, the recording medium may be also referred to as the storage medium.

Further, when the recording medium 28 storing the information processing program is set to the drive device 23, the information processing program is installed on the auxiliary storage device 24 via the drive device 23 from the recording medium 28. Further, the information processing program downloaded from the network can be installed on the auxiliary storage device 24 via the interface device 27.

The auxiliary storage device 24 stores the installed information processing program, and files and data as needed. The memory 25 reads out the information processing program from the auxiliary storage device 24 and stores the information processing program at the time of activating the server 200. Then, in accordance with the information processing program stored in the memory 25, the computing device 26 implements various processing to be described later.

Since the hardware configuration of the terminal apparatus 400 is substantially the same as that of the server 200, the description thereof will be omitted. Further, the terminal apparatus 400 can employ, for example, a tablet type terminal apparatus or a smartphone, and can include a display operation device implemented by a touch panel or the like instead of the input device 21 and the output device 22.

Hereinafter, a description is given of the type determination DB 240 and the form definition DB 250 of the server 200.

FIG. 3 is an example of the type determination DB 240 of the first embodiment. The type determination DB 240 includes information items, such as definition identification (ID), definition type, form type, and identification character string or identification text string. In the type determination DB 240, the item of "definition ID" is associated with other items, and information including the value of the item of "definition ID" and the values of other items are collectively referred to as the type determination information. Further, if a form image includes a character string of "company R" and a character string of "invoice," the type of form indicated by the item of "form type" becomes "invoice for company R."

The value of the item of "definition ID" indicates an identifier identifying each form definition information.

The value of the item of "definition type" indicates the type of form definition information. In this disclosure, the type of form definition information includes, for example, general-use definition information, individual-user definition information, and specific definition information as indicated in FIG. 3. The specific definition information corresponds to the form definition information used for defining specific forms issued by specific business entities. For example, the specific form corresponds to a slip of courier, used in general.

The value of the item of "form type" indicates the type of form. Specifically, the type of form includes, for example, invoice, estimate, purchase order, or the like. The value of the item of "identification character string" indicates a character string used for specifying or identifying the type of form. For example, if a form image includes a character string of "invoice form" or a character string of "invoice," the type of form indicated by the item of "form type" becomes "invoice."

In an example case of FIG. 3, the type of definition information associated with the definition ID of "H01" is the general-use definition information, and the general-use definition information associated with the definition ID of "H01" is information defining a layout of "invoice." These information are referred to in a case when a character string of "invoice" or a character string of "invoice form" is extracted from the form image data.

Hereinafter, a description is given of the form definition DB 250 with reference to referring to FIGS. 4 to 7. FIG. 4 is an example of the form definition DB 250 storing a plurality of types of the form definition information.

As indicated in FIG. 4, the form definition DB 250 stores, for example, general-use definition information 251, and specific definition information 252. The form definition DB 250 further stores individual-user definition information 253 generated by the definition registration unit 290.

In this disclosure, the priority level can be set to each of the three types of form definition information stored in the form definition DB 250. Then, when the form recognition processing is performed on specific form image data, the item and the item value that are extracted using the form definition information having the higher priority level can be used as the recognition result.

For example, since the general-use definition information 251 indicates the form definition information of forms having a higher versatility layouts used by a plurality of users (general users), the priority level of the general-use definition information 251 may be set with the lowest priority level among the three types of form definition information.

Further, since the individual-user definition information 253 indicates the form definition information of forms having layouts designed by an individual-user himself or herself, the priority level of the individual-user definition information 253 may be set with the highest level to indicate that the individual-user definition information 253 is the most important definition among the three types of form definition information.

Further, the specific definition information 252 indicates the form definition information defining layouts of specific forms, generally used, the priority level of the specific definition information 252 becomes the intermediate level among the three types of form definition information.

Hereinafter, a description is given of each of the form definition information stored in the form definition DB 250.

FIG. 5 is an example of the general-use definition information 251 according to the first embodiment. The general-use definition information 251, generated for each definition ID, includes information items, such as item ID, item name, direction, distance, or the like. In other words, in the general-use definition information 251, the item of "definition ID" is associated with other items, and the general-use definition information 251 includes the value of the item of "definition ID" and the values of other items.

The value of the item of "item ID" is an identifier identifying each item included in the form. The value of the item of "item name" indicates a name of the item.

The items of "direction" and "distance" indicate a range used for extracting a character or text string. For example, if the value of the item of "direction" is "RD" and the value of the item of "distance" is "20 mm," the character string is extracted within a 20-mm range extending from the lower right coordinate of a rectangle circumscribing the character string indicating the "item name."

In other words, the items of "direction" and "distance" are conditions indicating the range in which the character string is to be extracted, and these conditions are associated with the item name. In an example case of FIG. 5, the items of "direction" and "distance" are described as the conditions indicating the range for extracting the character string, but the conditions may include another item.

Therefore, for example, a character string extracted from the 20 mm-range extending from the lower right coordinate of a rectangle circumscribing the character string indicating the "item name" of "TOTAL" associated with the item ID of "2" can be recognized as the value of the item name of "TOTAL."

In this description, it is assumed that the general-use definition information 251 includes information on all of the items, which can be included in the form with a given probability.

FIG. 6 is an example of the specific definition information 252 of the first embodiment. The specific definition information 252, registered for each specific form, includes information items, such as definition ID, item name, direction, distance, or the like. In an example case of FIG. 6, the definition ID, item name, direction, and distance are the same as those of the general-use definition information 251, and thereby the description thereof will be omitted.

In this description, the specific definition information 252 can be provided for each specific business entity. In this case, the specific definition information 252 may include a business entity ID as another information item.

FIG. 7 is an example of the individual-user definition information 253 of the first embodiment. The individual-user definition information 253, registered for each individual-user, includes information items, such as user ID, definition ID, item ID, item name, direction, distance, or the like.

The value of the item of "user ID" is an identifier identifying each individual-user. In the individual-user definition information 253, the definition ID, item name, direction, and distance are the same as those of the general-use definition information 251, and thereby the description thereof will be omitted.

In this disclosure, as to the definition type of the individual-user definition information, the definition ID of the form definition information defining the individual-user definition information may include the user ID.

Further, each individual-user can register and store the item-related information such as the item name and the condition indicating the range describing the item value in the individual-user definition information 253. Therefore, the item ID included in the individual-user definition information 253 may become a part of the item ID included in the general-use definition information 251 in some cases.

In an example case of FIG. 7, the individual-user definition information 253 is registered using the user ID of "A" and the individual-user definition information 253 includes the definition ID of "A01" and the form type of "invoice for company R."

Hereinafter, a description is given of functional configuration of the server 200 with reference to FIG. 8. FIGS. 8A and 8B (FIG. 8) is an example of functional block diagram of the server 200 according to the first embodiment.

In the server 200, for example, the information processing program stored in the memory 25, the auxiliary storage device 24 or the like is read out and executed by the computing device 26 to implement each function of each unit to be described later.

Figure 8A:
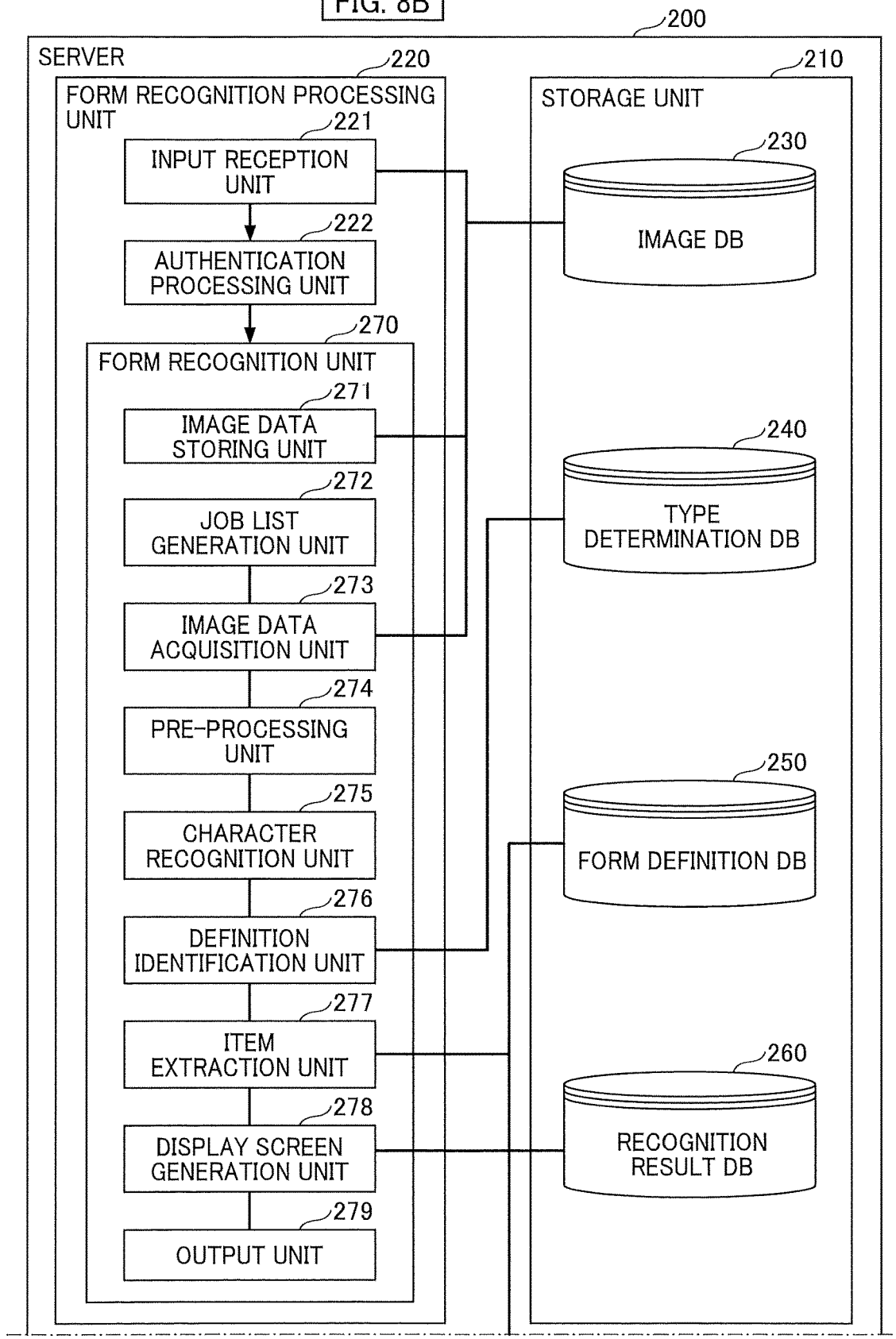
FIGS. 8A and 8B (FIG. 8) are an example block diagram of a functional configuration of a server according to the first embodiment.

As indicated in FIG. 8A, the server 200 includes, for example, a form recognition processing unit 220, and a definition registration unit 290. The form recognition processing unit 220 includes, for example, an input reception unit 221, an authentication processing unit 222, and a form recognition unit 270.

The input reception unit 221 receives various inputs to the server 200. Specifically, the input reception unit 221 receives an input of the authentication information to log in to the form recognition system 100. The authentication information is, for example, a user ID and a password. Further, the input reception unit 221 receives, for example, an input of form image data transmitted from the image forming apparatus 300.

The authentication processing unit 222 performs authentication processing based on the authentication information input or received via the input reception unit 221. Further, for example, the authentication processing unit 222 can be configured to transmit the input authentication information to an authentication server provided outside the server 200 and obtain the authentication result from the authentication server. When the user is authenticated, the authentication processing unit 222 may transfer the form image data received by the input reception unit 221 to the form recognition unit 270.

As indicated in FIG. 8A, the form recognition unit 270 includes, for example, an image data storing unit 271, a job list generation unit 272, an image data acquisition unit 273, a pre-processing unit 274, a character recognition unit 275, a definition identification unit 276, an item extraction unit 277, a display screen generation unit 278, and an output unit 279.

When the image data storing unit 271 receives the form image data from the image forming apparatus 300, the image data storing unit 271 stores the form image data in the image DB 230.

The job list generation unit 272 receives an input of the form image data from the image forming apparatus 300 via the input reception unit 221, registers a job in a job list, and manages or controls the job list. The details of the job list will be described later. Hereinafter, the job may mean one or more jobs.

The image data acquisition unit 273 acquires the form image data stored in the image DB 230. The pre-processing unit 274 performs pre-processing on the form image data acquired by the image data acquisition unit 273 before the form recognition processing is performed on the form image data.

The character recognition unit 275 extracts, from the form image data, the character string and information indicating the position where the character string is arranged, and then retains the character string and information indicating the character-string-arranged position as the recognition result information. The details of the recognition result information will be described later.

The definition identification unit 276 refers to the type determination DB 240 to identify or specify the definition ID corresponding to the character string included in the recognition result information. In other words, based on the character string extracted from the form image data, the definition identification unit 276 identifies or specifies the form definition information to be referred to during the form recognition processing and acquires the identified or specified form definition information, in which the definition identification unit 276 is used as an acquisition unit.

Based on the form definition information identified or specified by the definition identification unit 276 and the recognition result information, the item extraction unit 277 extracts the items and the item values included in the form image data and associates the items and the item values to generate the recognition result data associating the item ID and the item value for each item. For example, the item extraction unit 277 can generate the recognition result data using extensible markup language (XML) format file. Further, the item extraction unit 277 extracts the description position of the item, and information indicating the positional relationship between the item and the item value included in the form image data.

The display screen generation unit 278 generates a recognition result confirmation screen using the recognition result data stored in the recognition result DB 260. The item name to be displayed on the recognition result confirmation screen can be registered in advance in association with the item ID. Then, when the recognition result confirmation screen is generated, the item name corresponding to the item ID included in the recognition result data is identified and displayed on the recognition result confirmation screen.

The output unit 279 outputs the recognition result confirmation screen generated by the display screen generation unit 278. In other words, the output unit 279 displays the recognition result confirmation screen generated by the display screen generation unit 278 on a web browser of the terminal apparatus 400.

Figure 8B:
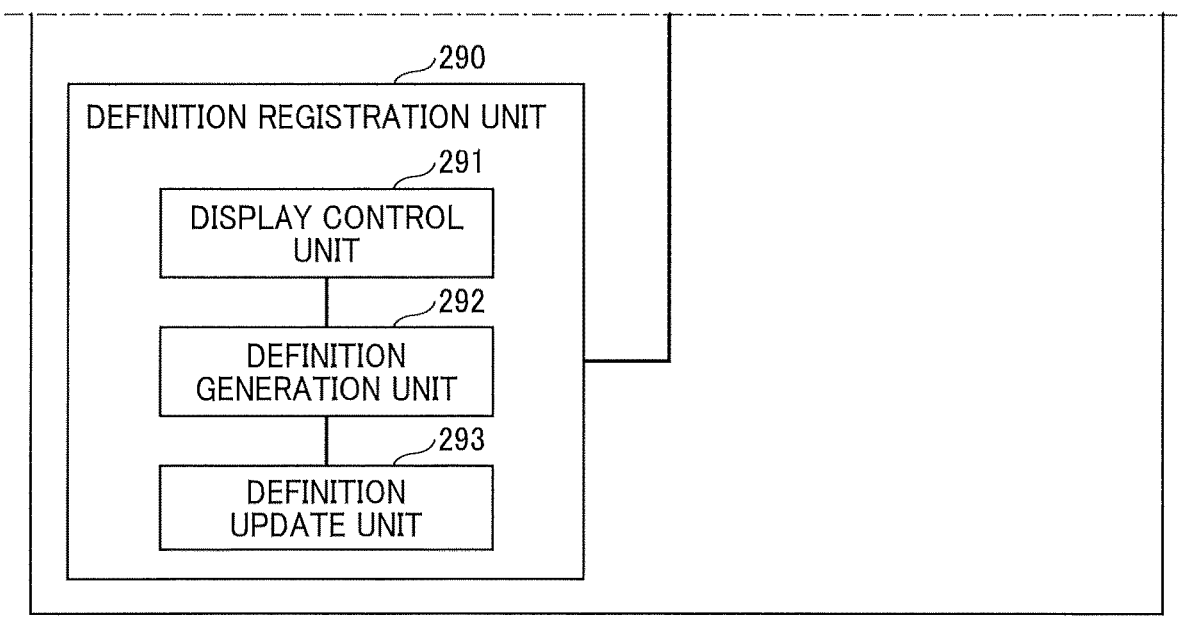

As indicated in FIG. 8B, the definition registration unit 290 includes, for example, a display control unit 291, a definition generation unit 292, and a definition update unit 293.

The display control unit 291 causes the terminal apparatus 400 to display a screen used for generating the individual-user definition information. Specifically, the display control unit 291 generates an XML format file to be used for displaying the screen and displays an input screen on the web browser of the terminal apparatus 400.

In this disclosure, the display control unit 291 displays the screen used for generating the individual-user definition information on the terminal apparatus 400, but not limited thereto. For example, the display control unit 291 can display the screen using any display apparatus other than the terminal apparatus 400, such as the server 200 having a display function.

The definition generation unit 292 generates the individual-user definition information based on the information input via the input screen of the terminal apparatus 400. Specifically, the definition generation unit 292 generates the type determination information including the definition ID of to-be-generated new individual-user definition information and stores the type determination information in the type determination DB 240. Further, based on the input value, the definition generation unit 292 generates and stores the individual-user definition information in the form definition DB 250.

The definition update unit 293 updates the individual-user definition information by reflecting a correction or modification to the individual-user definition information registered in the form definition DB 250.

Figure 9A:
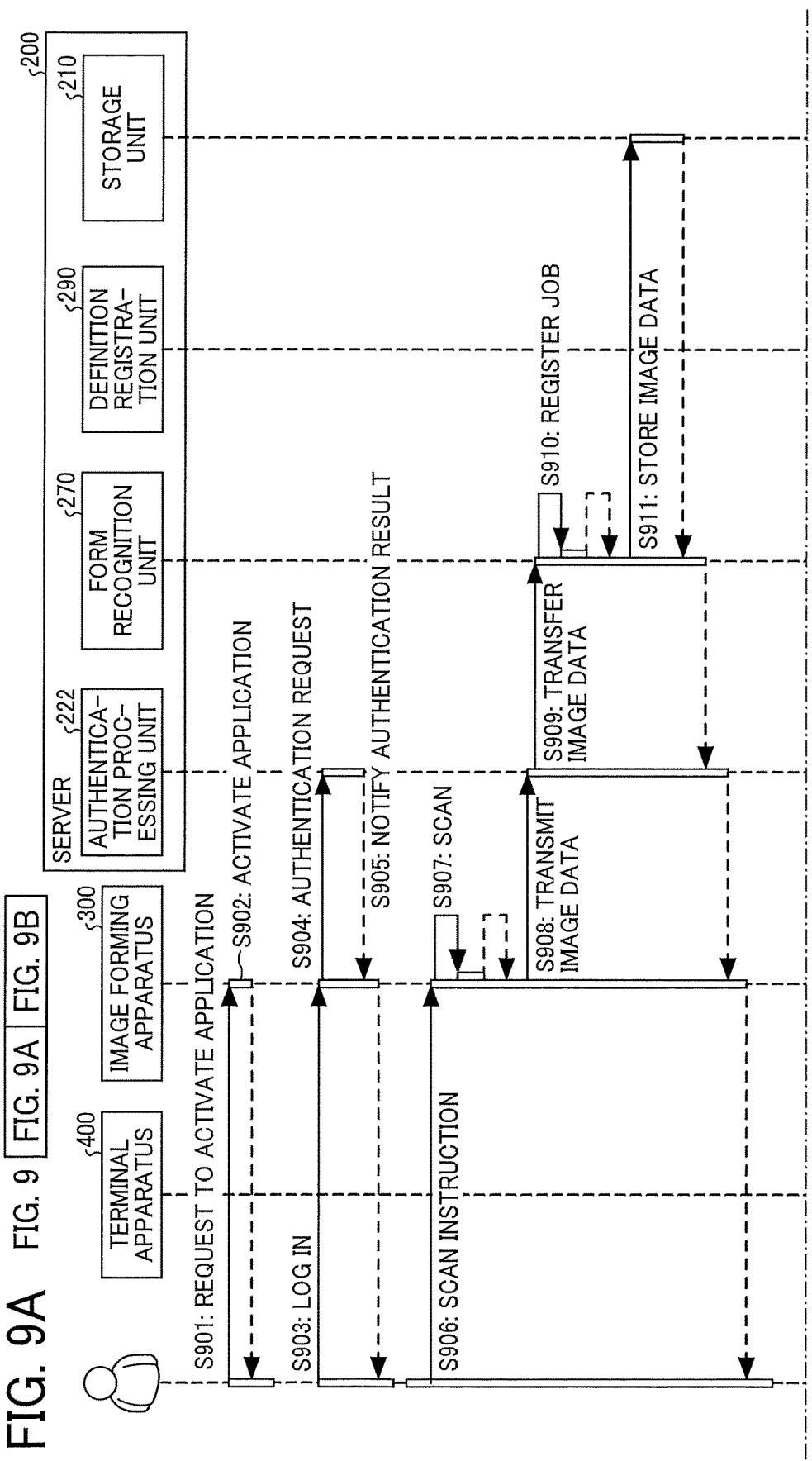

Hereinafter, a description is given of an operation of the form recognition system 100 with reference to FIG. 9. FIGS. 9A and 9B (FIG. 9) are an example sequence diagram illustrating the operation of the form recognition system 100 according to the first embodiment.

In the form recognition system 100, if the image forming apparatus 300 receives a request for activating an application for performing the form recognition processing from a user (step S901), the image forming apparatus 300 activates the application (step S902).

Then, if the image forming apparatus 300 receives the authentication information input by the user (step S903), the image forming apparatus 300 transmits the authentication information to the server 200 to request a user authentication (step S904).

In response to receiving the user authentication request, the server 200 performs the user authentication using the authentication processing unit 222 and notifies an authentication result to the image forming apparatus 300 (step S905). Hereinafter, it is assumed that the user is authenticated successfully.

Then, the image forming apparatus 300 receives a scan instruction of a form (step S906), and scans the form to acquire form image data (step S907).

Then, the image forming apparatus 300 transmits the form image data to the server 200 (step S908).

When the input reception unit 221 of the server 200 receives the input of the form image data, the authentication processing unit 222 transfers the form image data to the form recognition unit 270 (step S909).

When the form recognition unit 270 of the server 200 receives the form image data, the job list generation unit 272 registers a job in the job list (step S910), in which the job may be one or more jobs.

Then, the form recognition unit 270 instructs the image data storing unit 271 to store the form image data in the image DB 230 (step S911).

Then, the form recognition unit 270 acquires the form image data, to be recognized as recognition target form image data, from the image DB 230 using the image data acquisition unit 273 (step S912), performs the form recognition processing on the form image data, and the generates the recognition result data using the item extraction unit 277 (step S913).

Then, the form recognition unit 270 stores the recognition result data, generated using the item extraction unit 277, in the recognition result DB 260 (step S914).

In the form recognition system 100, if the terminal apparatus 400 receives an input of display instruction of a browser from the user (step S915), the terminal apparatus 400 transmits a display request of the browser used for displaying the recognition result data to the server 200 (step S916).

If the terminal apparatus 400 receives an input of authentication information from the user (step S917), the terminal apparatus 400 transmits the authentication information to the server 200 (step S918).

Then, the server 200 authenticates the user using the authentication processing unit 222 (step S919), and notifies the authentication result to the terminal apparatus 400 (step S920). Hereinafter, it is assumed that the user is authenticated successfully.

Then, if the terminal apparatus 400 receives the input of a browsing instruction of the recognition result of the form image from the user (step S921), the terminal apparatus 400 transmits a browsing request of the recognition result to the server 200 (step S922).

In response to receiving the browsing request, the server 200 acquires the recognition result data stored in the recognition result DB 260 (step S923), generates and displays a recognition result confirmation screen on the browser of the terminal apparatus 400 (step S924), with which the user can confirm the recognition result on the recognition result confirmation screen displayed on the display of the terminal apparatus 400.

Then, if the terminal apparatus 400 receives an input of registration instruction of the individual-user definition information from the user (step S925), the terminal apparatus 400 transmits the registration request of the individual-user definition information to the server 200 (step S926).

In response to receiving the registration request of the individual-user definition information at the server 200, the display control unit 291 of the definition registration unit 290 instructs the terminal apparatus 400 to display the registration screen of the individual-user definition information on the display of the terminal apparatus 400 (step S927).

In response to receiving an input of the individual-user definition information at the terminal apparatus 400 (step S928), the terminal apparatus 400 transmits the input individual-user definition information to the server 200 (step S929).

Then, the server 200 generates the individual-user definition information based on the information transmitted from the terminal apparatus 400 using the definition generation unit 292 (step S930), stores the individual-user definition information in the form definition DB 250 (step S931), and terminates the sequence. The details of the processing performed by the definition registration unit 290 will be described later.

Hereinafter, a description is given of information generated by operating the form recognition system 100 with reference to FIG. 10. Specifically, the information generated by operating the form recognition system 100 includes the job list and the recognition result data.

FIGS. 10A and 10B are examples of information generated by operating the form recognition system 100 according to the first embodiment. FIG. 10A is an example of a job list 101 generated by the job list generation unit 272.

When the form image data is input to the server 200 from the image forming apparatus 300, the server 200 retains the job list associating the form image data and the job ID using the job list generation unit 272.

As indicated in FIG. 10A, the job list 101 includes information items, such as job ID, user ID, form image file path, recognition result file path, status, and definition ID.

The value of the item of "job ID" is an identifier identifying each job. In other words, the value of the item of "job ID" is an identifier identifying the form image data received from the image forming apparatus 300.

The value of the item of "user ID" is an identifier identifying each user who has logged in the form recognition system 100.

The value of the item of "image file path" is information indicating a location where the form image data is stored.

The value of the item of "recognition result file path" is information indicating a location where the recognition result data, obtained by performing the form recognition processing on the form image data, is stored.

The value of the item of "status" indicates a progress status of the form recognition processing on the form image data.

The value of the item of "definition ID" indicates the definition ID identifying a specific form definition information to be referred to when performing the form recognition processing on the form image data, stored in the location indicated by the value of the item of "image file path."

When the server 200 receives the form image data from the image forming apparatus 300, the job list generation unit 272 adds a job ID to the form image data, associates the job ID with the user ID obtained as the authentication information, and adds the form image data added with the job ID and the user ID to the job list 101 as one record. When the form image data is stored in the image DB 230, the job list generation unit 272 adds information indicating a storage location of the stored form image data as the value of the item of "image file path."

Further, if the form definition information to be referred to is identified when to perform the form recognition processing on the form image, the job list generation unit 272 adds the definition ID of the identified form definition information as the value of the item of "definition ID."

Then, if the form recognition processing on the form image is completed and the recognition result data is stored in the recognition result DB 260, the job list generation unit 272 adds information indicating a storage location of the recognition result data as the value of the item of "recognition result file path," and sets the value of the item of "status" to "completed."

FIG. 10B is an example of the recognition result data generated by the item extraction unit 277. As to the recognition result data 102 illustrated in FIG. 10B, the items and the item value included in the form image data are extracted and associated with each other, and the result of associating the item ID and the item value of each item is described using the XML format.

In this example case of FIG. 10B, when the recognition result data 102 is generated and stored in the recognition result DB 260, the storage location of the recognition result data 102 is set as the value of the item of "recognition result file path" of the job list 101.

Figure 11:
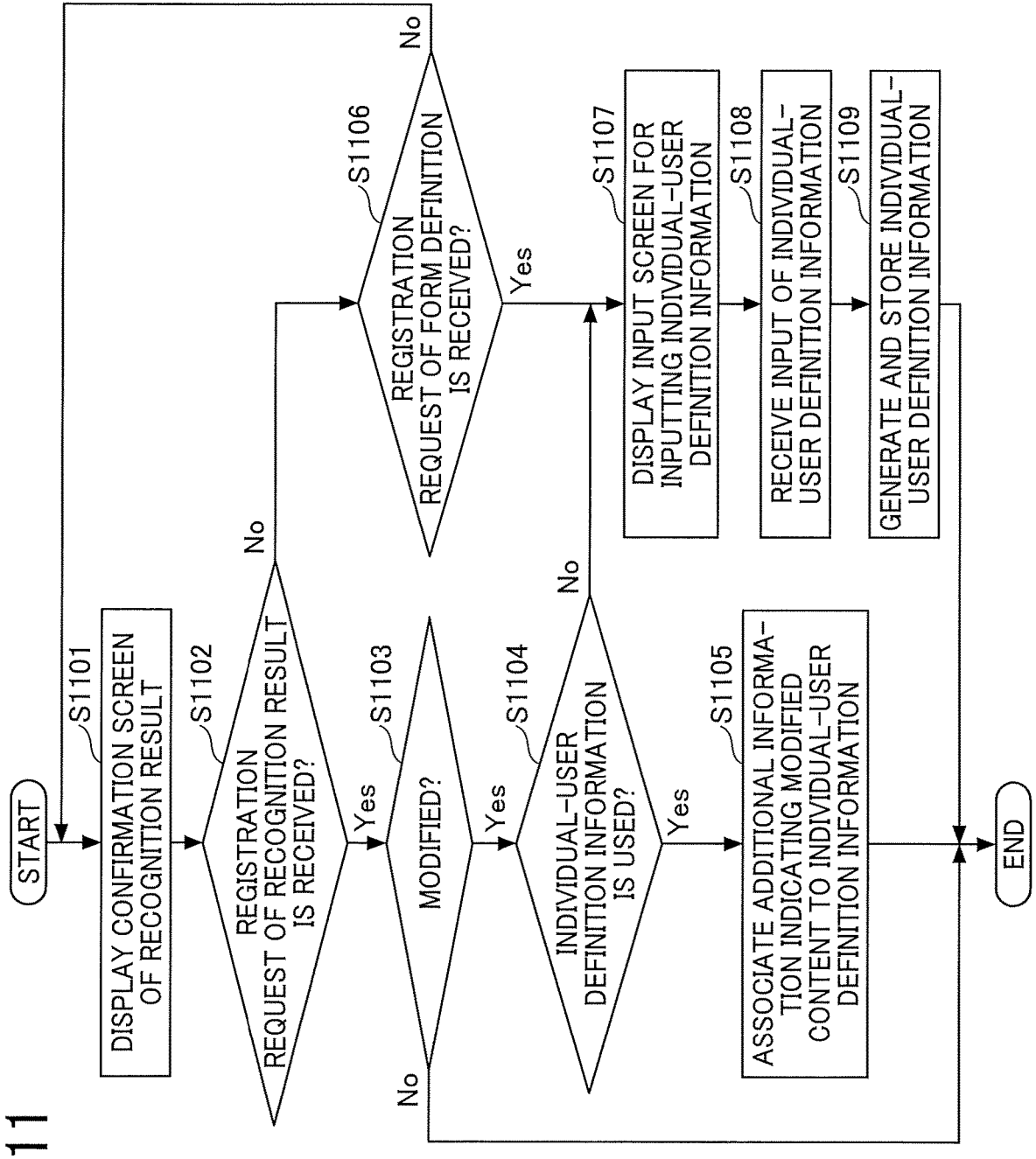
FIG. 11 is a flowchart illustrating processing of a definition registration unit according to the first embodiment.

Hereinafter, a description is given of processing of the definition registration unit 290 with reference to FIG. 11. FIG. 11 is a flowchart illustrating the processing of the definition registration unit 290 of the first embodiment. FIG. 11 illustrates the details of the processing from steps S924 to S931 in FIG. 9.

The server 200 instructs the terminal apparatus 400 to display a confirmation screen of the form recognition result obtained by the form recognition unit 270 (step S1101).

Then, the server 200 determines whether or not a request for registration of the recognition result is received from the terminal apparatus 400 (step S1102). Specifically, the server 200 determines whether the server 200 receives an instruction of storing the recognition result data, displayed on the confirmation screen, into the recognition result DB 260.

If the registration request of the recognition result data is not received in step S1102 (S1102: No), the server 200 proceeds the sequence to step S1106, which will be described later.

If the registration request of the recognition result data is received in step S1102 (S1102: Yes), the server 200 determines whether or not the recognition result data is modified or corrected on the confirmation screen (step S1103). If the recognition result data is not modified or corrected in step S1103 (S1103: No), the server 200 terminates the sequence.

If the recognition result data is modified or corrected in step S1103 (S1103: Yes), the definition registration unit 290 determines whether the definition generation unit 292 has used the individual-user definition information for the form recognition processing on the form image data (step S1104). Specifically, the definition generation unit 292 refers to the job list 101 generated by the job list generation unit 272 and acquires the definition ID associated with the file path of the recognition result data to determine the form definition information used for the form recognition processing on the form image data.

If the individual-user definition information is not used in step S1104 (S1104: No), the definition registration unit 290 proceeds the sequence to step S1107, which will be described later.

If the individual-user definition information is used in step S1104 (S1104: Yes), the definition update unit 293 generates additional information indicating the modified or corrected content and associates the additional information with the individual-user definition information stored in the form definition DB 250 (step S1105), and then terminates the sequence.

If the registration request of the recognition result data is not received in step S1102 (S1102: No), the server 200 determines whether the server 200 receives a registration request of the form definition (i.e., individual-user definition information) from the terminal apparatus 400 (step S1106).

If the registration request of the form definition (i.e., individual-user definition information) is not received in step S1106 (S1106: No), the server 200 returns the sequence to step S1101.

If the registration request of the form definition (i.e., individual-user definition information) is received in step S1106 (S1106: Yes), the definition registration unit 290 uses the display control unit 291 to display an input screen used for inputting the individual-user definition information on the display of the terminal apparatus 400 (step S1107).

Then, the server 200 receives an input of the individual-user definition information from the terminal apparatus 400 (step S1108).

Then, the definition generation unit 292 generates the individual-user definition information based on the input individual-user definition information, stores and registers the individual-user definition information in the form definition DB 250 (step S1109), and then terminates the sequence.

Hereinafter, a description is given of a transition of screens on the terminal apparatus 400 from the confirmation result to the input screen used for inputting the individual-user definition information with reference to the drawings.

FIG. 12A is an example of a screen 120 of the recognition result generated by the display screen generation unit 278 of the first embodiment. The screen 120 illustrated in FIG. 12A is used as a confirmation screen for notifying a user to confirm the recognition result generated by performing the form recognition processing on the form image data.

As indicated in FIG. 12A, the screen 120 displays, for example, a form image 121 and information 122 (e.g., invoice information). The form image 121 is read or scanned by the image forming apparatus 300, and the information 122 associates the items and the item values extracted by the form recognition unit 270. Further, the screen 120 displays a registration button 123 and a definition registration screen button 124 to be used when instructing a registration of the individual-user definition information. A user refers to the form image 121 to check the items and the item values displayed on the screen 120, and then corrects or modifies the item values as needed. Then, if the registration button 123 is selected (e.g., pressed) by the user, the corrected item value is registered in the recognition result data.

Further, in the embodiment, when the registration button 123 is selected, a dialog used for setting the identification character string of the individual-user definition, which becomes the key information when registering the individual-user definition information, can be displayed on the display, from which a user can set the information. For example, when the registration button 123 is selected, in addition to the item of "biller (of invoice)," items of "biller (of invoice) telephone number" and "biller (of invoice) account number" are displayed as candidates of the identification character strings on the dialog, and then a specific candidate selected by the user can be set as the identification character string. Further, a combination of a plurality of identification character strings can be set as the candidate of the identification character string, such as a combination of "biller (of invoice)" and "biller (of invoice) telephone number" can be set as the candidate of the identification character string.

Further, as to the candidate of identification character string, a part of a specific character string can be set as a fixed character string, and then the user can set a specific identification character string from the candidate including the fixed character string. For example, as to the item of "biller (of invoice)," which is one candidate of the identification character string, a character string of "invoice," which is a part of the specific identification character string, can be set as the fixed character string, and then the user can select the identification character string including "invoice" from the candidates of the identification character string such as "biller (of invoice)" and "biller (of invoice) telephone number."

In this disclosure, for example, when the registration button 123 is selected, the image data indicating the form image 121 and the information 122 can be stored in the main system 500. Further, the user can download the registered recognition result data via the confirmation screen of the recognition result and register the downloaded recognition result data into the main system 500 via an operation screen of the main system 500.

Further, the screen 120 can display information 125 indicating the form definition information which was referred to when performing the form recognition processing on the form image 121. In this disclosure, by displaying the information 125, the user can be notified which type of form definition information is used for performing the form recognition processing on the form image 121.

FIG. 12B is another example of a screen 120A of the recognition result generated by the display screen generation unit 278 of the first embodiment. As indicated in FIG. 12B, the screen 120A displays the form image 121, the information 122, the registration button 123, the definition registration screen button 124 displayed on the screen 120 (FIG. 12A), and further, information 122A input by the user. The screen 120A (FIG. 12B) can be configured to display, for example, the recognition result generated by the display screen generation unit 278 and an input field for allowing the user to input information, in which the information input in the input field can be set as the information 122A on the screen 120A.

In the embodiment, the information 122A input by the user on the screen 120A can be registered in association with the individual-user definition information. For example, when the accounting system is set as the main system 500, an entry or input of subject code and an entry or input of department code are required, but these code information cannot be extracted from the form image data. Therefore, these code information is manually input by the user as the information 122A. In the following description, the information input by the user on the screen 120A is referred to as user input information. In the embodiment, by registering the user input information in association with the individual-user definition information, the recognition result obtained by performing the form recognition processing using the individual-user definition information and the user input information corresponded to or associated with the individual-user definition information can be automatically and collectively displayed on a recognition result screen. Therefore, when each time the form recognition processing is performed using the individual-user definition information, a workload of inputting the information, which cannot be automatically displayed using conventional methods, can be reduced. Further, in the embodiment, the user input information can be input by selecting one or more specific codes from the codes registered in advance.

Hereinafter, a description is given of an example case of associating the user input information and the individual-user definition information with reference to FIG. 12C. FIG. 12C is an example table associating the user input information and the individual-user definition information. In FIG. 12C, individual-user definition information 253A includes the individual-user definition information 253 associated with user input information 253B. The user input information 253B is associated with the individual-user definition information 253 based on the definition ID and the user ID, and stored in the form definition database 250. In an example case of FIG. 12C, the user input information 253B and the individual-user definition information 253 are registered and stored in the same table, but not limited thereto. For example, the user input information 253B and the individual-user definition information 253 can be registered and stored in different tables.

Hereinafter, a description is given of an example of a display in a case of inputting a correction or modification on the confirmation screen with reference to FIG. 13. FIG. 13 is another example of the confirmation screen of the recognition result generated by the display screen generation unit 278.

As indicated in FIG. 13, a screen 130 displays form image 121A, the registration button 123, the definition registration screen button 124, and an input field 131 used for correcting or modifying one or more contents (hereinafter, referred to as content or contents).

In the form image 121A, a character string to be used as a candidate of the item value after the correction is highlighted or emphasized using a marker as indicated in FIG. 13.

In this example case, the input field 131 includes, for example, a display section 132 and a display section 133. The display section 132 displays a message indicating a method of correction or modification, and the display section 133 displays the item and the item value selected as the target of correction or modification. The input field 131 further includes buttons 134, 135 and 136. The button 134 is used to instruct an addition of candidate of the items and the item values included in the form image 121A. The button 135 is used to notify the completion of correction or modification to the server 200. The button 136 is used to cancel the correction or modification. Hereinafter, the items and the item values may be simply referred to as the item and the item name corresponding to one or more items and item names.

In an example case of FIG. 13, among the item names and the item values extracted and displayed on the screen 120 (FIG. 12) as the recognition result, the item of "biller (of invoice)" and the item value of "R Corporation" are selected.

Therefore, the item of "biller (of invoice)" and the item value of "R Corporation" are displayed in the display section 133. Further, on the form image 121A, the character strings highlighted or emphasized using markers 121-1, 121-2, and 121-3 are presented as candidates of the item value of "biller (of invoice)."

In this disclosure, if the form image 121A is recognized based on the individual-user definition information, additional information reflecting the modified or corrected content input on the screen 130 is generated, and then the additional information is stored in the form definition DB 250 in association with the individual-user definition information.

For example, if the value of the item of "biller (of invoice)" is corrected or modified to "hardware department," which is the character string highlighted or emphasized by the marker 121-3, information indicating the positional relationship between the position of the character string of "biller (of invoice)" and the position of the character string of "hardware department" within the form image 121A is generated as the additional information.

Hereinafter, a description is given of a transition of screens when registering the individual-user definition information with reference to FIGS. 14 to 18.

Figure 14:
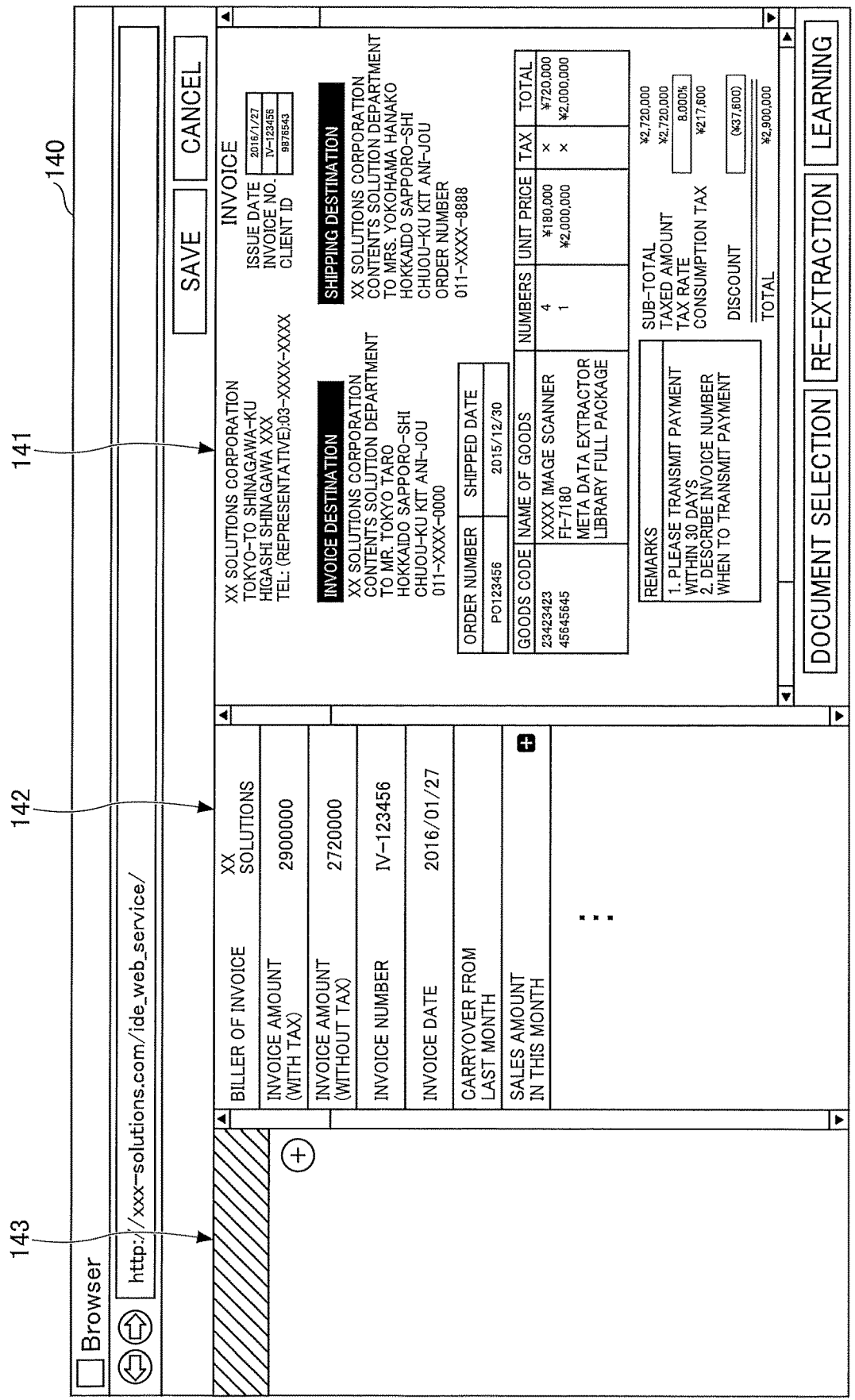
FIG. 14 is an example of a registration screen (as first stage screen) of individual-user definition information according to the first embodiment.

FIG. 14 is an example of a registration screen (as first stage screen) of the individual-user definition information according to the first embodiment. A screen 140 illustrated in FIG. 14 is an example of a registration screen of the individual-user definition information.

In this disclosure, if the definition registration screen button 124 instructing the registration of the individual-user definition information is operated on the screen 120 (FIG. 12), the screen displayed on the terminal apparatus 400 shifts from the screen 120 (FIG. 12) to the screen 140 (FIG. 14).

As indicated in FIG. 14, the screen 140 includes, for example, display sections 141, 142 and 143. The display section 141 displays a form image obtained by the server 200.

The display section 142 displays the recognition result of the form image displayed on the display section 141. Specifically, the display section 142 displays a list of the item names and the item values extracted as the recognition result of the form image. Hereinafter, the list of the item names and the item values may be simply referred to as the item list. The recognition result displayed in the display section 142 is the recognition result, which is acquired by performing the form recognition processing based on the general-use definition information or the specific definition information.

The display section 143 displays an input field used for inputting information on to-be-generated new individual-user definition information.

In this disclosure, for example, if a specific item is selected from the item list being displayed on the display section 142 on the screen 140, the display section 142 displays an input field used for inputting information defining the selected specific item name and the specific value related to the selected specific item. In other words, the display section 142 is used as an input reception section to receive the input of the individual-user definition information.

In this disclosure, if a specific item is selected from the item list being displayed in the display section 142 on the screen 140, the display section 143 displays an input field used for inputting information related to the individual-user definition information, and then the type determination information corresponding to the to-be-generated new individual-user definition information is added to the type determination DB 240.

FIG. 15 is an example of a registration screen (as second stage screen) of the individual-user definition information according to the first embodiment. In an example case in FIG. 15, a screen 150 indicates a state when the item of "sales amount in this month" is selected from the item list being displayed in the display section 142 on the screen 140.

As to the screen 150, the display section 141 displays the form image, and the display section 142 displays an input field 151 used for inputting information of the selected item of "sales amount in this month" and information defining the item value of the selected item of "sales amount in this month." In other words, when the input reception section (i.e., display section 142) receives a selection of a specific item, the input field 151 used for inputting the individual-user definition information is displayed in a part of the input reception section (i.e., display section 142).

The input field 151 displays an input field 152 used for inputting information defining the positional relationship between the item name and the item value of the item of "sales amount in this month" and a data type of the item value. In this disclosure, the general-use definition information and the specific definition information used for recognizing the form image data can be displayed in the input field 152, and the displayed definition information can be edited. In other words, when the definition information is input from the input field 152, the information defining the specific item and the value of the specific item in the general-use definition information and/or the specific definition information can be referred to.

Further, the display section 143 displays an input field 153 used for inputting information related to the to-be-added individual-user definition information. In this description, the information related to the individual-user definition information can be the type determination information corresponding to the to-be-added individual-user definition information.

In this disclosure, when an icon 154 displayed in the input field 153 is selected, a text box used for inputting the type determination information is displayed in the input field 153.

Figure 16:
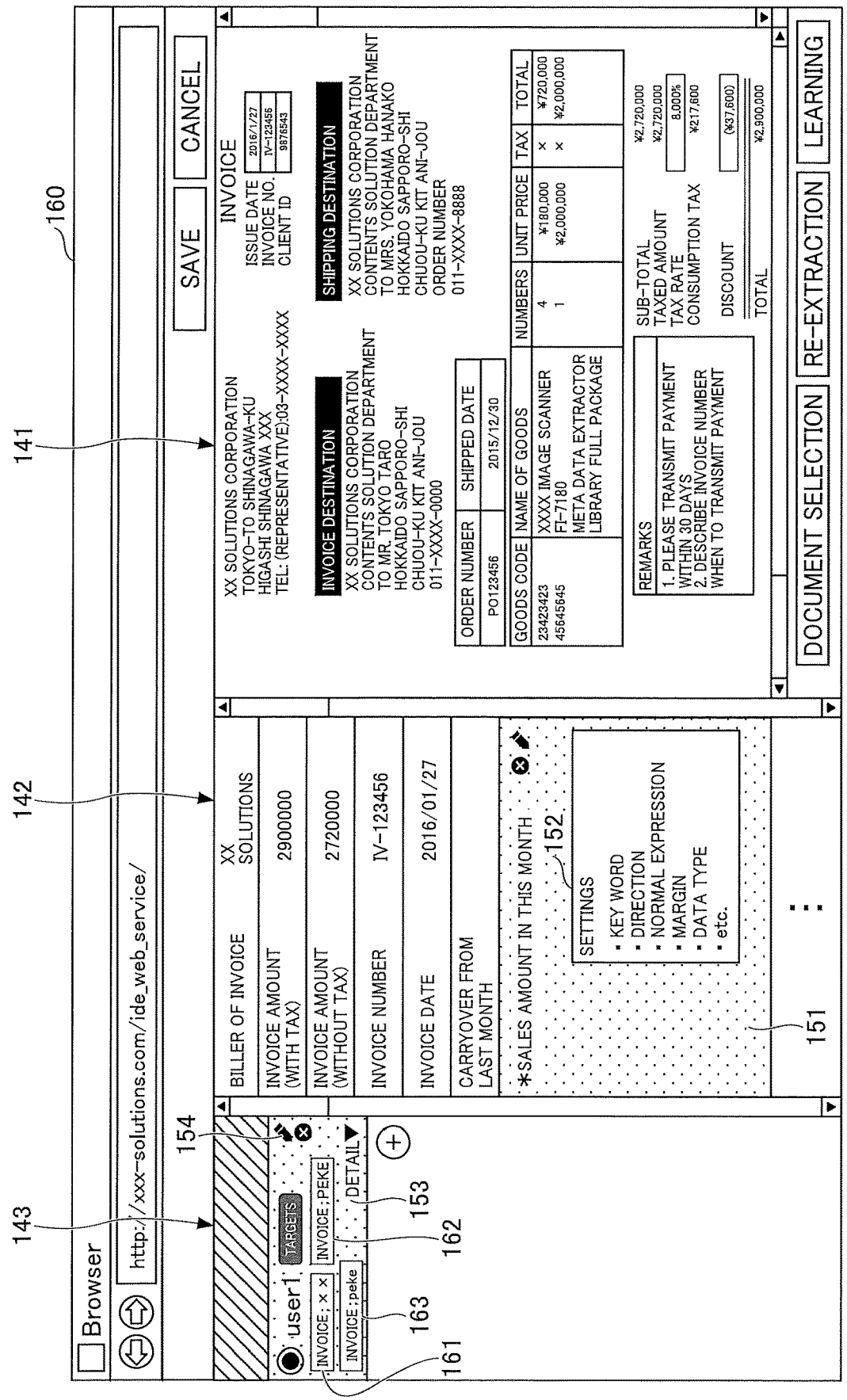
FIG. 16 is an example of a registration screen (as third stage screen) of individual-user definition information according to the first embodiment.

FIG. 16 is an example of a registration screen (as third stage screen) of the individual-user definition information according to the first embodiment. In an example case in FIG. 16, a screen 160 indicates a state when the icon 154 is selected on the screen 150 (FIG. 15) and then text boxes 161, 162 and 163 are displayed in the input field 153.

A combination of the form type and the identification character string included in the type determination information of the to-be-added individual-user definition information can be input into the respective text boxes 161, 162, and 163.

For example, the form type of "invoice" and the identification character string of "xx" are input into the text box 161 while the form type of "invoice" and the identification string of "peke" are input into the text box 162.

In this disclosure, the form type and the identification character string input into the input field 153 are associated with the definition type of "individual-user definition information" and assigned with the definition ID, and then stored in the type determination DB 240 as the type determination information.

In this disclosure, when the information defining the item and the item value are input into the input field 152, the input definition information content is associated with the definition ID included in the type determination information input into the input field 153 as the individual-user definition information, and then the individual-user definition information is stored in the form definition DB 250.

Figure 17:
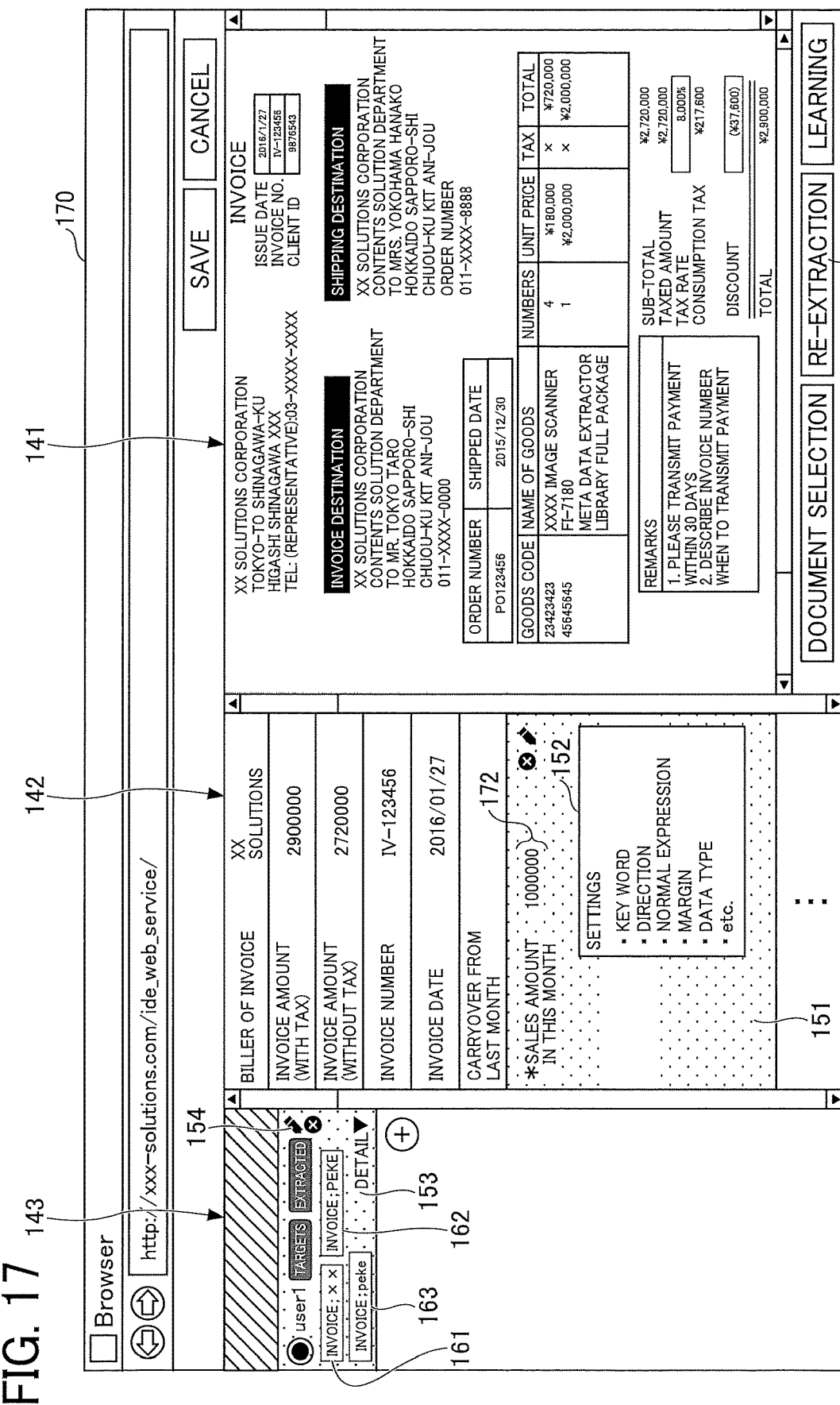
FIG. 17 is an example of a registration screen (as fourth stage screen) of individual-user definition information according to the first embodiment.

FIG. 17 is an example of a registration screen (as fourth stage screen) of the individual-user definition information according to the first embodiment. In an example case in FIG. 17, a screen 170 indicates a state when a specific item value selected from the item list, being displayed in the display section 142, is extracted based on the individual-user definition information newly input on the screen 160 (FIG. 16).

In this disclosure, when a re-extraction button 171 displayed under the display section 141 is operated, the item value is re-extracted from the form image displayed in the display section 141 based on the individual-user definition information input on the screen 160 (FIG. 16).

As to the screen 170, the item of "sales amount in this month" is selected in the display section 142 and the re-extraction button 171 is operated while the individual-user definition information is being registered. In this example case, a value 172, which is extracted using the new individual-user definition information, is displayed at a position corresponding to a position of the character string of "sales amount in this month" displayed as the item name in the input field 151 on the screen 170.

At this stage, since the form image is being displayed in the display section 141 on the screen 170, the user can easily determine whether or not the item and the item value, which are extracted based on the new individual-user definition information, match the information in the form image being displayed in the display section 141.

Figure 18:
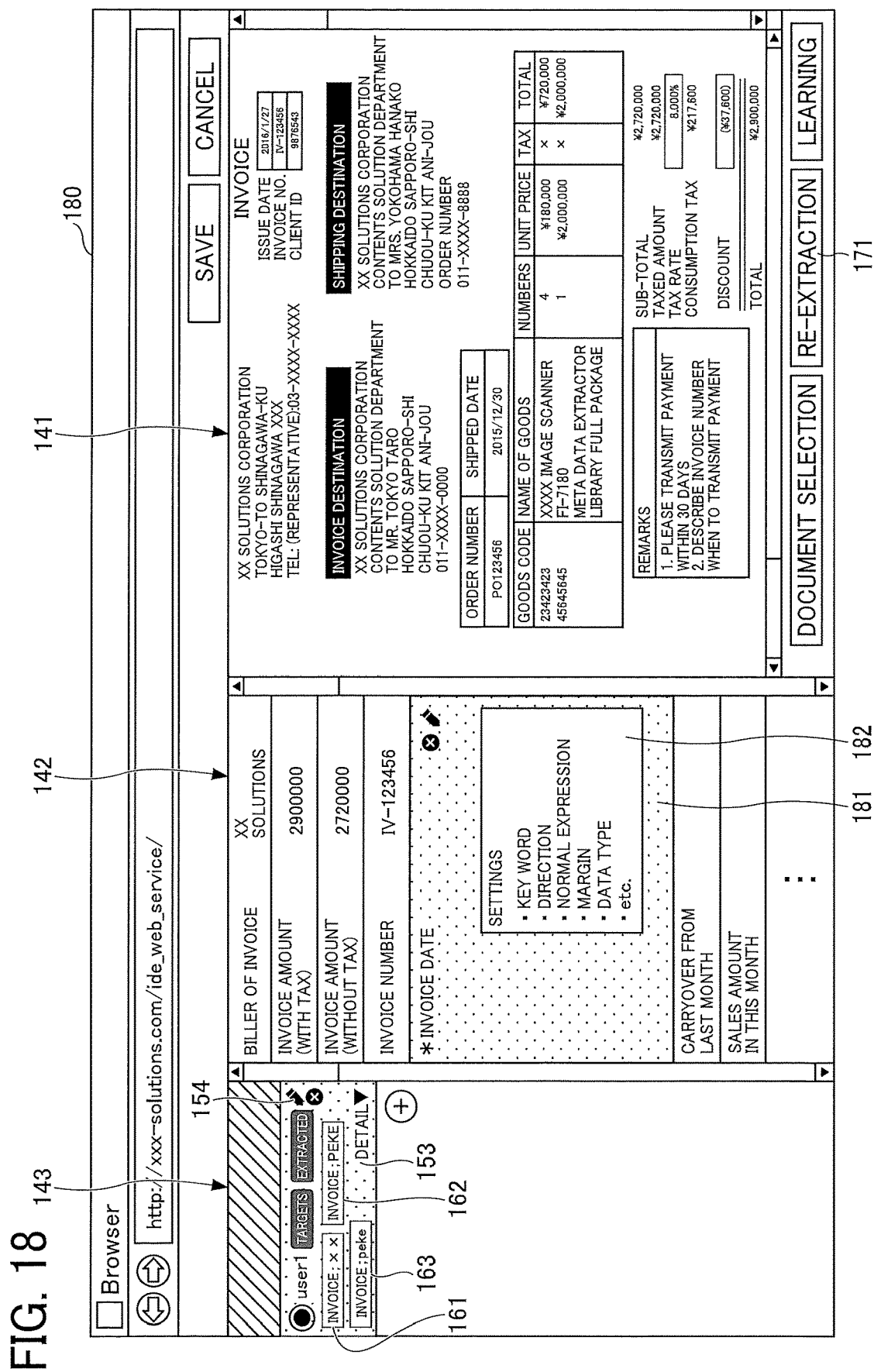
FIG. 18 is an example of a registration screen (as fifth stage screen) of individual-user definition information according to the first embodiment.

FIG. 18 is an example of a registration screen (as fifth stage screen) of the individual-user definition information according to the first embodiment. As to a screen 180 illustrated in FIG. 18, the item of "invoice date" is selected from the item list being displayed in the display section 142, and an input field 181 used for inputting information defining the item of "invoice date" and the value of the item of "invoice date" is displayed in the display section 142.

The input field 181 further displays an input field 182 used for defining a positional relationship between the item of "invoice date" and the value of the item of "invoice date," and a data type of the item value.

In this example case, the input field 181 is configured not to display the item value extracted by using the general-use definition information or the specific definition information at the position corresponding to the position of the character string of "invoice date" being displayed as the item name.

As to the screen 180, for example, if the information defining the item of "invoice date" and the item value of "invoice date" are input into the input field 182 and then the re-extraction button 171 is operated, a value extracted using the new individual-user definition information is displayed at the position corresponding to the position of the character string of "invoice date."

As to the above-described first embodiment, when the form image data is recognized using the general-use definition information or the specific definition information, the item list (e.g., item names and item values) is extracted as the recognition result of the form image data, and then the item list and the input reception section (i.e., display section 142) used for receiving the input of the individual-user definition information can be displayed collectively. Then, if a specific item is selected from the item list being displayed in the input reception section (i.e., display section 142), the input field used for inputting the individual-user definition information related to the specific item and the value of the specific item are displayed in the input reception section (i.e., display section 142).

Therefore, as to the first embodiment, the individual-user definition information can be input by referring to the recognition result based on the general-use definition information or the specific definition information, and thereby the individual-user definition information can be easily generated. In other words, the definition information defining the form can be generated easily in the first embodiment.

Second Embodiment

Hereinafter, a description is given of a second embodiment with reference to the following drawings. Different from the first embodiment, in the second embodiment, the individual-user definition information is input without referring to the form definition information stored in the form definition DB 250 in advance. Therefore, in the description of the second embodiment, the difference from the first embodiment is described, and the same reference numerals are given to those having the same functional configuration as those of the first embodiment, and the description thereof will be omitted.

Figure 19:
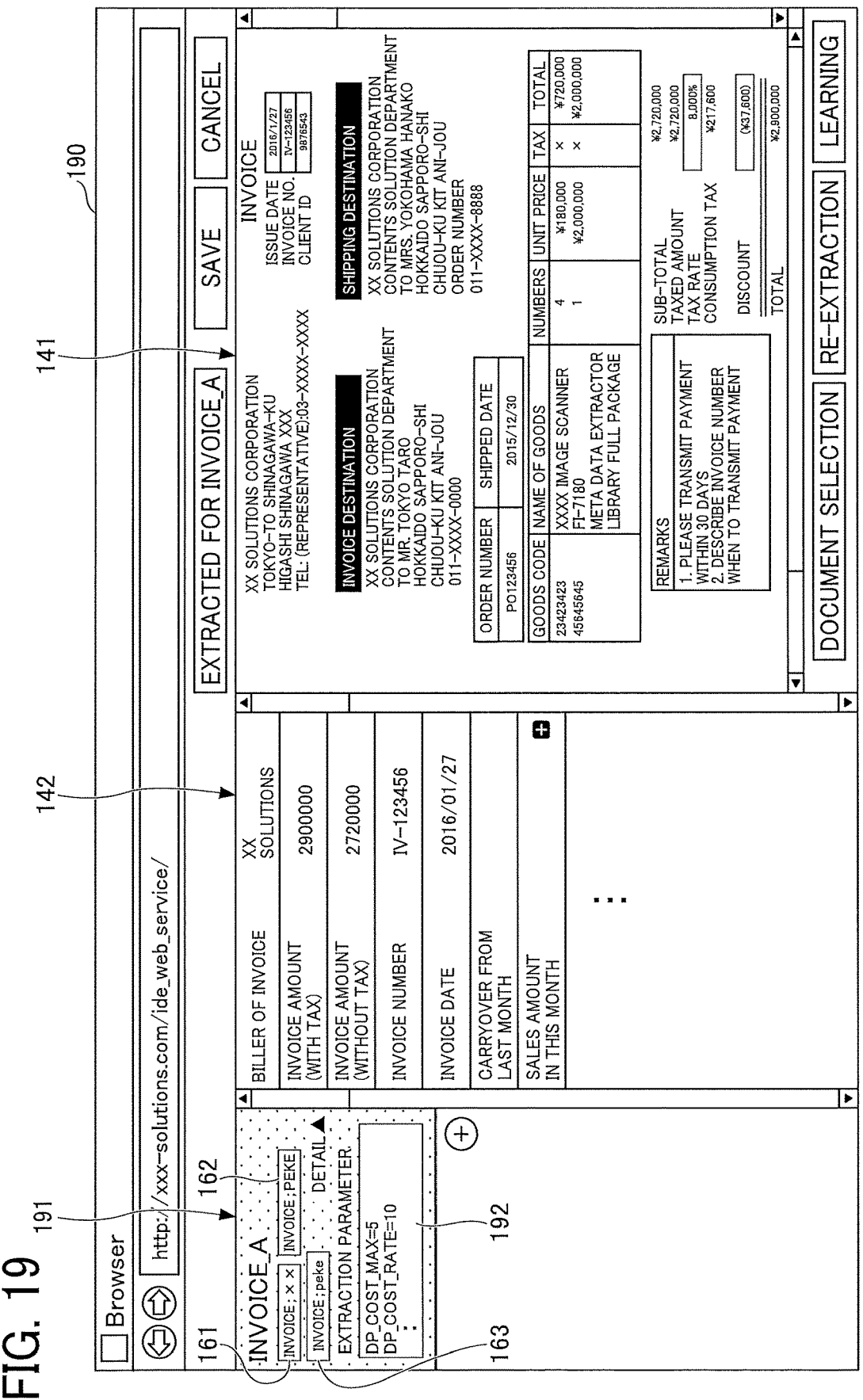
FIG. 19 is an example of a registration screen (as first stage screen) of individual-user definition information according to a second embodiment.

FIG. 19 is an example of a registration screen (as first stage screen) of the individual-user definition information according to the second embodiment. As indicated in FIG. 19, a screen 190 includes the display section 141 and the display section 142. The display section 141 displays the form image data while the display section 142 displays the item list (e.g., item names and item values) extracted as the recognition result of the form image data.

Further, the screen 190 displays an input field 191 used for inputting the type determination information of the to-be-generated new individual-user definition information.

The input field 191 displays text boxes 161, 162 and 163, in which a combination of the form type and the identification character string included in the type determination information is input. Further, the input field 191 includes an input field 192 used for inputting an extraction parameter to be referred to when extracting the form type and the identification character string from the form image data.

The extraction parameter includes, for example, the character string indicating the form type and coordinates indicating the position of the identification character string within the form image data.

Figure 20:
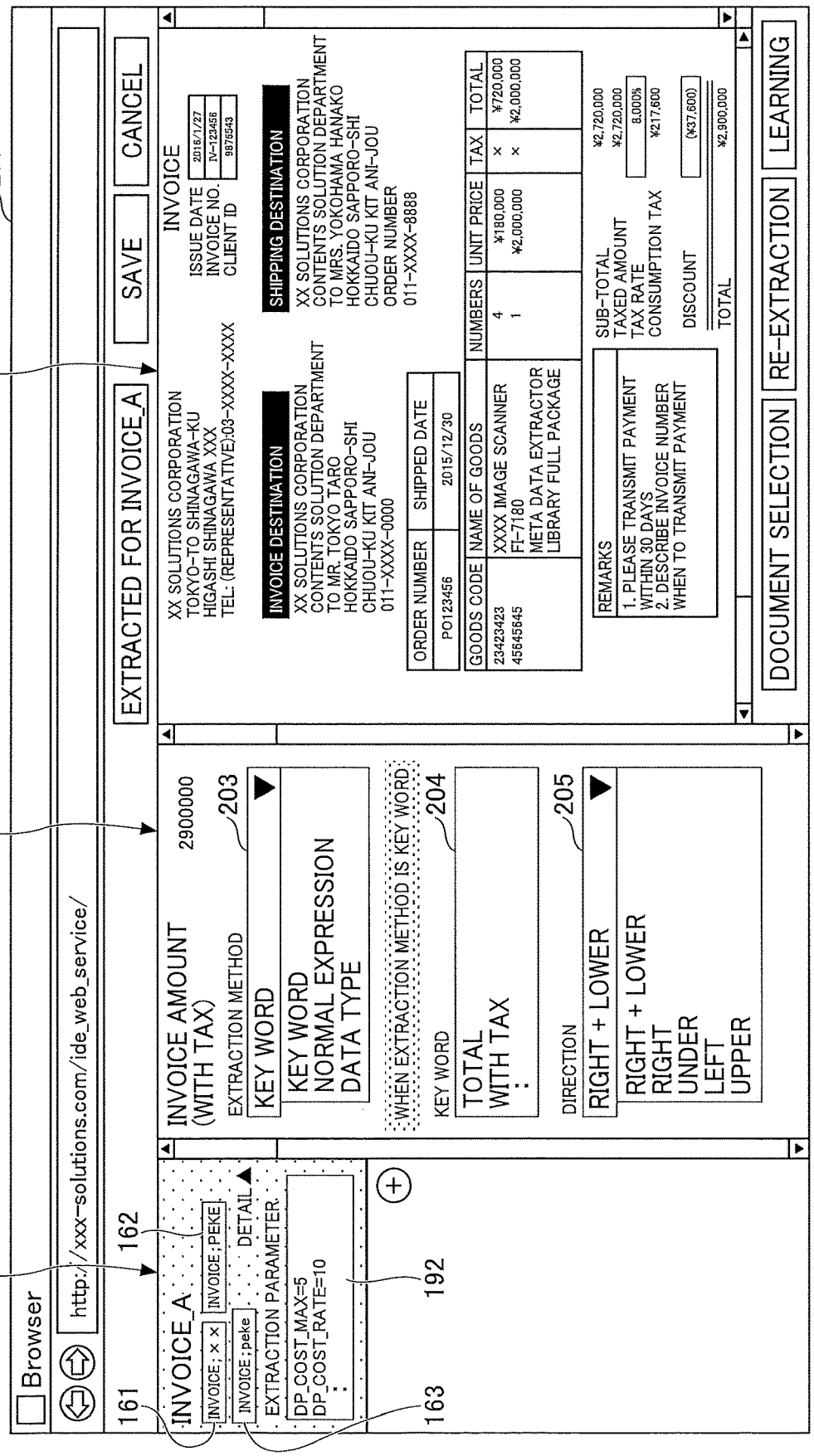
FIG. 20 is an example of a registration screen (as second stage screen) of individual-user definition information according to the second embodiment.

Further, for example, if a specific item is selected from the item list being displayed in the display section 142 on the screen 190, an input field 202 (FIG. 20) used for inputting information defining the item name and the item value is displayed in place of the display section 142 as illustrated in FIG. 20.

FIG. 20 is an example of a registration screen (as second stage screen) of the individual-user definition information according to the second embodiment. In an example case in FIG. 20, a screen 201 indicates a state when the item of "invoice amount (with tax)" is selected in the display section 142 on the screen 190 (FIG. 19).

The screen 201 displays the input field 202 used for inputting information defining the item of "invoice amount (with tax)" and the item value of "invoice amount (with tax)." The input field 202 displays, for example, a selection field 203 used for selecting a method of extracting the value of the item of "invoice amount (with tax)."

For example, if "KEY WORD" is selected in the selection field 203 as the extraction method, an input field 204 and a selection field 205 are displayed in the input field 202. The input field 204 is used for inputting a specific keyword (e.g., character string) to be extracted (i.e., target of extraction) while the selection field 205 is used for selecting the positional relationship between the to-be-extracted specific keyword and a numerical value to become the item value.

Figure 21:
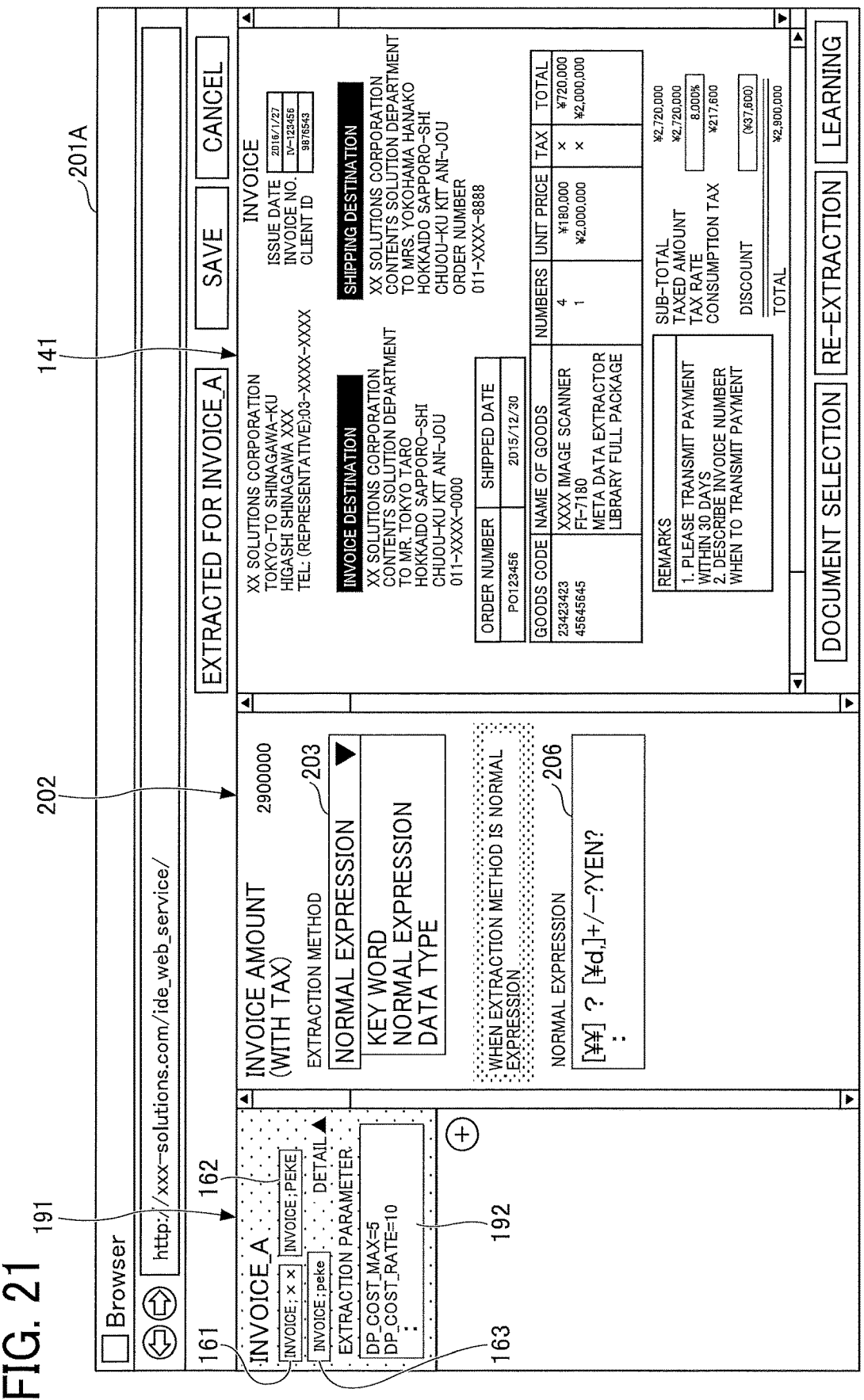
FIG. 21 is an example of a registration screen (as third stage screen) of individual-user definition information according to the second embodiment.

FIG. 21 is an example of a registration screen (as third stage screen) of the individual-user definition information according to the second embodiment. In an example case of FIG. 21, a screen 201A displays the input field 202 when "normal expression" is selected in the selection field 203.

In an example case of FIG. 21, the input field 202 displays an input field 206 used for inputting information defining "normal expression."

Figure 22:
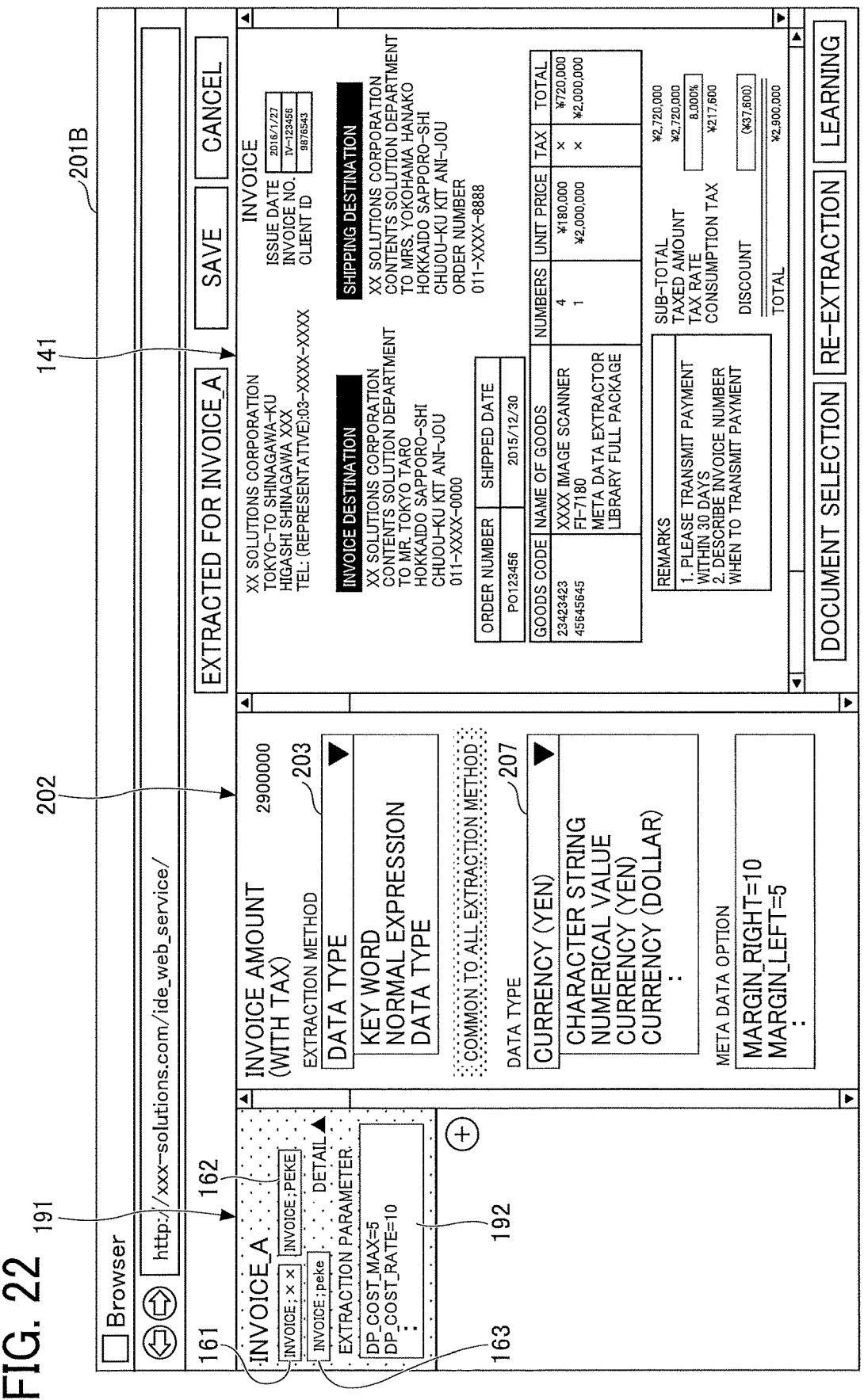
FIG. 22 is an example of a registration screen (as fourth stage screen) of individual-user definition information according to the second embodiment.

FIG. 22 is an example of a registration screen (as fourth stage screen) of the individual-user definition information according to the second embodiment. In an example case of FIG. 22, a screen 201B displays the input field 202 when "data type" is selected in the selection field 203.

In an example case of FIG. 22, the input field 202 displays a selection field 207 used for inputting information defining "data type."

As to the above-described second embodiment, the user can arbitrarily set information defining the item and the item value extracted using the pre-defined form definition information.

As to the above-described one or more embodiments, the items and the values of the items can be extracted from the form image using a plurality of form definition information, with which the form recognition processing can be performed with a higher precision or accuracy.

As to the above-described one or more embodiments, the definition information defining various form can be easily generated.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. It should be noted that the information processing system 1 described in the above embodiment is just one example, and various configurations can be applied to the system depending on the applications and the purposes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising:
circuitry configured to
    extract from a first form image, a character string and information indicating a position where the character string is arranged in the first form image;
    identify first form-definition information based on the extracted character string, the first form-definition information defining a positional relationship between an item name and an item value of an item included in the first form image, the item name and the item value comprising a character string of the item in the first form image;
    store the positional relationship in a storage unit;
    recognize the item name from the first form image;
    extract the item value from the first form image from a position in the first form image indicated by the positional relationship between the item name and the item value; and
    display, on a display, a first screen that includes the first form image and the item value of the extracted item, the first screen being configured to accept operations by a user to input second form-definition information for a user-defined form, the second form-definition information reflecting corrections or modifications of the first form-definition information, wherein
    in response to the first screen receiving the user operations to input the second form-definition information, the circuitry determines whether the first form image is stored in association with previously stored second form-definition information, and
        in a case where the stored first form image is associated with the previously stored second form-definition information, the previously stored second form-definition information is updated to include modifications or corrections to the previously stored second form-definition information input by the user, or
        in a case where the stored first form image is not associated with any previously stored second form-definition information, a second screen is displayed on the display, the second screen being configured to accept operations by a user to register the second form-definition information.

2. The information processing apparatus according to claim 1, wherein the circuitry is further configured to
    generate the second form-definition information based on a correspondence relationship between a position of the item value of the item and a position of the item name, when the position of the item value of the item is specified in the first form image displayed in the first screen; and
    register the generated second form-definition information.

3. The information processing apparatus according to claim 1, wherein
the item value extracted the first form image includes issuer information, and
the circuitry is further configured to
register the second form-definition information in association with the issuer information.

4. The information processing apparatus according to claim 3, wherein the circuitry is further configured to
accept a user operation to select the issuer information from among a plurality of pieces of issuer information identifying a plurality of issuers; and
register the second form-definition information in association with the issuer information selected by the user.

5. The information processing apparatus according to claim 3, wherein
the first form image is an invoice; and
the issuer information includes at least one of
a name of a biller of the invoice,
a telephone number of the biller of the invoice, or
an account number of the biller of the invoice.

6. The information processing apparatus according to claim 1, wherein the circuitry is further configured to
extract the item value from the first form image based on the previously stored second form-definition information.

7. The information processing apparatus according to claim 6, wherein the circuitry is further configured to
update the second form-definition information with the corrected item value, in a case where the item value extracted based on the second form-definition information is corrected by the user's operation.

8. The information processing apparatus according to claim 1, wherein
the second form-definition information includes individual-user definition information; and
the circuitry is further configured to register the individual-user definition information in association with the issuer information.

9. A method of processing information, comprising:
extracting from a first form image, a character string and information indicating a position where the character string is arranged in the first form image;
identifying first form-definition information based on the extracted character string, the first form-definition information defining a positional relationship between an item name and an item value of an item included in the first form image, the item name and the item value comprising a character string of the item in the first form image;
storing the positional relationship in a storage unit;
recognizing the item name from the first form image;
extracting the item value from the first form image from a position in the first form image indicated by the positional relationship between the item name and the item value; and
displaying, on a display, a first screen that includes the first form image and the item value of the extracted item, the first screen being configured to accept operations by a user to input second form-definition information for a user-defined form, the second form-definition information reflective corrections or modifications of the first form-definition information, wherein
in response to the first screen receiving the user operations to input the second form-definition information, the circuitry determines whether the first form image is stored in association with previously stored second form-definition information, and
in a case where the stored first form image is associated with the previously stored second form-definition information, the previously stored second form-definition information is updated to include modifications or corrections to the previously stored second form-definition information input by the user, or
in a case where the stored first form image is not associated with any previously stored second form-definition information, a second screen is displayed on the display, the second screen being configured to accept operations by a user to register the second form-definition information.

10. A non-transitory computer readable storage medium storing one or more instructions that cause a processor executing the one or more instructions to perform a method of processing information, the method comprising:
extracting from a first form image, a character string and information indicating a position where the character string is arranged in the first form image;
identifying first form-definition information based on the extracted character string, the first form-definition information defining a positional relationship between an item name and an item value of an item included in the first form image, the item name and the item value comprising a character string of the item in the first form image;
storing the positional relationship in a storage unit;
recognizing the item name from the first form image;
extracting the item value from the first form image from a position in the first form image indicated by the positional relationship between the item name and the item value; and
displaying, on a display, a first screen that includes the first form image and the item value of the extracted item, the first screen being configured to accept operations by a user to input second form-definition information for a user-defined form, the second form-definition information reflective corrections or modifications of the first form-definition information, wherein
in response to the first screen receiving the user operations to input the second form-definition information, the circuitry determines whether the first form image is stored in association with previously stored second form-definition information, and
in a case where the stored first form image is associated with the previously stored second form-definition information, the previously stored second form-definition information is updated to include modifications or corrections to the previously stored second form-definition information input by the user, or
in a case where the stored first form image is not associated with any previously stored second form-definition information, a second screen is displayed on the display, the second screen being configured to accept operations by a user to register the second form-definition information.

* * * * *